US012173553B2

(12) United States Patent
Hoogland et al.

(10) Patent No.: US 12,173,553 B2
(45) Date of Patent: Dec. 24, 2024

(54) SCREEN EDGE RETENTION AND SCREEN RETHREADING FEATURES FOR A HIDDEN SCREEN ASSEMBLY AND A FENESTRATION ASSEMBLY

(71) Applicant: Pella Corporation, Pella, IA (US)

(72) Inventors: Jonathan S. Hoogland, Altoona, IA (US); Evan R. Vande Haar, Pella, IA (US); Brian L. Kolb, Pella, IA (US); Scot C. Miller, Pella, IA (US); Steven D. Lauritsen, Otley, IA (US); Jennifer A. Tuetken, Pella, IA (US); Todd A. Bernhagen, Pella, IA (US)

(73) Assignee: Pella Corporation

( * ) Notice: Subject to any disclaimer, the term of this patent is extended or adjusted under 35 U.S.C. 154(b) by 0 days.

(21) Appl. No.: 18/096,959

(22) Filed: Jan. 13, 2023

(65) Prior Publication Data

US 2023/0175311 A1 Jun. 8, 2023

Related U.S. Application Data

(62) Division of application No. 16/222,416, filed on Dec. 17, 2018, now Pat. No. 11,643,864.

(Continued)

(51) Int. Cl.
*E06B 9/54* (2006.01)
*E06B 3/44* (2006.01)
(Continued)

(52) U.S. Cl.
CPC .............. *E06B 3/4415* (2013.01); *E06B 7/22* (2013.01); *E06B 7/2307* (2013.01); *E06B 7/231* (2013.01);
(Continued)

(58) Field of Classification Search
CPC ...... E06B 9/54; E06B 2009/543; E06B 9/581; E06B 2009/528; E06B 2009/588;
(Continued)

(56) References Cited

U.S. PATENT DOCUMENTS 267,618 A 11/1882 Tribe
604,620 A 5/1898 Kolb et al.
(Continued)

FOREIGN PATENT DOCUMENTS

CA 1045535 A 1/1979
CA 1087458 A 10/1980
(Continued)

*Primary Examiner* — Abe Massad
(74) *Attorney, Agent, or Firm* — FAEGRE DRINKER BIDDLE & REATH

(57) ABSTRACT

A fenestration assembly includes a sash, a frame surrounding the sash, and at least one screen assembly mounted in at least one of: the top portion and the bottom portion. The frame includes a top portion, a bottom portion, and two jambs forming first slots extending lengthwise along at least a portion of the jamb. The first slots each include a screen edge retention feature. The screen assembly includes a roller assembly substantially hidden from view, a screen material attached to the roller assembly, and a plurality of raised features. Edges of the screen material extend into the first slots. The raised features are attached to each of the edges of the screen material. The raised features are configured to engage the screen edge retention features and retain each of the edges of the screen material at least partially within the first slot of each of the two jambs.

8 Claims, 17 Drawing Sheets

Related U.S. Application Data

(60) Provisional application No. 62/687,322, filed on Jun. 20, 2018, provisional application No. 62/620,877, filed on Jan. 23, 2018, provisional application No. 62/620,876, filed on Jan. 23, 2018.

(51) Int. Cl.

| | |
|---|---|
| ***E06B 7/22*** | (2006.01) |
| ***E06B 7/23*** | (2006.01) |
| ***E06B 9/58*** | (2006.01) |
| ***E06B 9/60*** | (2006.01) |
| ***E06B 9/80*** | (2006.01) |
| *E06B 9/52* | (2006.01) |

(52) U.S. Cl.

CPC .............. *E06B 7/2314* (2013.01); *E06B 9/54* (2013.01); *E06B 9/581* (2013.01); *E06B 9/582* (2013.01); *E06B 9/60* (2013.01); *E06B 9/80* (2013.01); *E06B 2003/4492* (2013.01); *E06B 2009/528* (2013.01); *E06B 2009/588* (2013.01); *E06B 2009/807* (2013.01); *E06B 2009/808* (2013.01)

(58) Field of Classification Search

CPC .. E06B 3/4415; E06B 7/22; E06B 2003/4492; E06B 9/58; E06B 2009/585

See application file for complete search history.

(56) References Cited

U.S. PATENT DOCUMENTS

| | | | | | |
|---|---|---|---|---|---|
| 618,830 | A | | 2/1899 | Barr | |
| 1,059,964 | A | | 4/1913 | Hutchinson | |
| 1,114,990 | A | | 10/1914 | Hutchinson | |
| 1,349,438 | A | | 8/1920 | Samplawski | |
| 1,694,314 | A | * | 12/1928 | Dixson | E06B 9/54 160/273.1 |
| 2,015,993 | A | | 10/1935 | Drake | |
| 2,051,422 | A | | 8/1936 | Rissmann | |
| 2,054,003 | A | | 9/1936 | Rissmann | |
| 2,056,341 | A | | 10/1936 | Bulmer | |
| 2,079,718 | A | | 5/1937 | Sgritta | |
| 2,107,755 | A | | 2/1938 | Kemp | |
| 2,131,521 | A | | 9/1938 | Nye | |
| 2,132,986 | A | | 10/1938 | Julien | |
| 2,191,166 | A | | 2/1940 | Werner et al. | |
| 2,200,481 | A | | 5/1940 | Thexton | |
| 2,220,756 | A | | 11/1940 | Egli | |
| 2,221,515 | A | | 11/1940 | Goldenberg | |
| 2,225,050 | A | | 12/1940 | Herzog | |
| 2,235,295 | A | | 3/1941 | Morgan | |
| 2,239,006 | A | | 4/1941 | Krywonis | |
| 2,243,790 | A | | 5/1941 | Blood | |
| 2,261,141 | A | | 11/1941 | Davis | |
| 2,261,142 | A | | 11/1941 | Davis | |
| 2,261,443 | A | | 11/1941 | Mcgaw | |
| 2,276,716 | A | | 3/1942 | Cardona | |
| 2,293,968 | A | | 8/1942 | Chandler et al. | |
| 2,302,638 | A | | 11/1942 | Messina | |
| 2,314,026 | A | | 3/1943 | Willett | |
| 2,323,295 | A | | 7/1943 | Brewer | |
| 2,327,232 | A | | 8/1943 | Wheeler | |
| 2,336,530 | A | | 12/1943 | Chandler et al. | |
| 2,352,609 | A | | 7/1944 | Bates | |
| 2,354,832 | A | | 8/1944 | Ristine | |
| 2,365,454 | A | | 12/1944 | Chandler et al. | |
| 2,368,770 | A | | 2/1945 | Norden | |
| 2,379,120 | A | | 6/1945 | Turner | |
| 2,386,016 | A | | 10/1945 | Turner | |
| 2,388,044 | A | | 10/1945 | Drab | |
| 2,406,761 | A | | 9/1946 | Golkowski | |
| 2,420,301 | A | | 5/1947 | Cusumano | |
| 2,432,808 | A | | 12/1947 | Royak | |
| 2,462,520 | A | | 2/1949 | Marbach | |
| 2,491,555 | A | | 12/1949 | Fistor | |
| 2,501,454 | A | | 3/1950 | Schueren | |
| 2,514,274 | A | | 7/1950 | Zagrodny | |
| 2,514,438 | A | | 7/1950 | Bardega | |
| 2,517,514 | A | | 8/1950 | Walsh | |
| 2,553,868 | A | | 5/1951 | Piva, Jr. | |
| 2,560,440 | A | | 7/1951 | Heeren | |
| 2,573,590 | A | | 10/1951 | Mosebach | |
| 2,575,128 | A | | 11/1951 | Renzetti | |
| 2,584,369 | A | | 2/1952 | Renton | |
| 2,595,364 | A | | 5/1952 | Lockhart | |
| 2,595,508 | A | | 5/1952 | Bridges | |
| 2,605,823 | A | | 8/1952 | Lockhart | |
| 2,615,512 | A | | 10/1952 | Friis | |
| 2,615,513 | A | | 10/1952 | Radford | |
| 2,637,381 | A | | 5/1953 | Bowman | |
| 2,711,788 | A | | 6/1955 | Covi | |
| 2,758,644 | A | | 8/1956 | Virlouvet | |
| 2,825,400 | A | | 3/1958 | Poulsen | |
| 2,826,789 | A | | 3/1958 | Etling | |
| 2,844,196 | A | | 7/1958 | Jones | |
| 2,908,326 | A | | 10/1959 | Jewell | |
| 2,925,859 | A | | 2/1960 | Baker, Jr. | |
| 3,005,489 | A | | 10/1961 | Crocker et al. | |
| 3,008,518 | A | | 11/1961 | Hayes | |
| 3,017,927 | A | | 1/1962 | Demko | |
| 3,024,837 | A | | 3/1962 | Mcphail | |
| 3,030,654 | A | | 4/1962 | Romuald et al. | |
| 3,105,542 | A | | 10/1963 | Lynch | |
| 3,116,097 | A | | 12/1963 | Novales | |
| 3,141,497 | A | | 7/1964 | Griesser | |
| 3,152,354 | A | | 10/1964 | Diack | |
| 3,155,146 | A | | 11/1964 | Malouf et al. | |
| 3,158,195 | A | | 11/1964 | Ney | |
| 3,168,355 | A | | 2/1965 | La Vern | |
| 3,173,474 | A | | 3/1965 | Wootten | |
| 3,179,161 | A | | 4/1965 | Johnson | |
| 3,219,374 | A | | 11/1965 | Snell | |
| 3,244,222 | A | | 4/1966 | Johnson | |
| 3,314,201 | A | | 4/1967 | Riegelman | |
| 3,352,349 | A | | 11/1967 | Hennequin | |
| 3,398,779 | A | | 8/1968 | Kuss | |
| 3,414,039 | A | | 12/1968 | King | |
| 3,425,165 | A | | 2/1969 | Cleveland | |
| 3,448,943 | A | | 6/1969 | Herou | |
| 3,470,934 | A | | 10/1969 | Agnew | |
| 3,489,199 | A | | 1/1970 | Weikel et al. | |
| 3,489,200 | A | | 1/1970 | Recchione | |
| 3,503,169 | A | | 3/1970 | Johnson et al. | |
| 3,552,471 | A | | 1/1971 | Hurst et al. | |
| 3,553,891 | A | | 1/1971 | Casebolt et al. | |
| 3,658,111 | A | | 4/1972 | Herms | |
| 3,698,036 | A | | 10/1972 | Goodman | |
| 3,729,045 | A | | 4/1973 | Macdonald | |
| 3,732,913 | A | | 5/1973 | Wrono | |
| 3,753,458 | A | | 8/1973 | Lazarek | |
| 3,764,172 | A | | 10/1973 | Standke | |
| 3,837,126 | A | | 9/1974 | Voiturier et al. | |
| 3,842,890 | A | | 10/1974 | Kramer | |
| 3,858,638 | A | | 1/1975 | Soeffker | |
| 3,882,921 | A | | 5/1975 | Sandall | |
| 3,889,434 | A | | 6/1975 | Shelver | |
| 3,891,020 | A | | 6/1975 | Mennuto | |
| 3,911,990 | A | | 10/1975 | Hoover et al. | |
| 3,935,681 | A | | 2/1976 | Voiturier et al. | |
| 3,974,316 | A | | 8/1976 | Jacquemin et al. | |
| 4,001,972 | A | | 1/1977 | Hurwitz | |
| 4,006,770 | A | | 2/1977 | Ferguson | |
| 4,009,745 | A | | 3/1977 | Erpenbeck | |
| 4,019,555 | A | | 4/1977 | Oshiro | |
| 4,027,431 | A | | 6/1977 | Rackard | |
| 4,028,849 | A | | 6/1977 | Anderson | |
| 4,033,087 | A | | 7/1977 | Shelver | |
| 4,040,210 | A | | 8/1977 | Land | |
| 4,084,360 | A | | 4/1978 | Reckson | |
| 4,095,640 | A | | 6/1978 | Beckerer, Jr. | |
| 4,125,141 | A | | 11/1978 | Stillwell | |
| 4,133,366 | A | | 1/1979 | Jenkins, Sr. | |
| 4,163,817 | A | | 8/1979 | DiCarlantoino et al. | |

(56) References Cited

U.S. PATENT DOCUMENTS 4,188,992 A 2/1980 Segerljung
4,193,500 A 3/1980 Scott
4,196,767 A 4/1980 Kent
4,197,896 A 4/1980 Reichstadt
4,204,015 A 5/1980 Levine et al.
4,222,200 A 9/1980 Beirnes
4,237,664 A 12/1980 Wilmes
4,249,589 A 2/1981 Loeb
4,253,278 A 3/1981 Dallaire
4,258,517 A 3/1981 Hammond
4,261,524 A 4/1981 Ludenbach
4,263,760 A 4/1981 Gell
4,295,305 A 10/1981 Shelver
4,297,812 A 11/1981 McPhail
4,306,387 A 12/1981 Hopkins et al.
4,311,183 A 1/1982 Herbst et al.
4,323,104 A 4/1982 Guttman
4,344,255 A 8/1982 Knoll
4,359,079 A 11/1982 Bledsoe
4,359,081 A 11/1982 Brower
4,363,349 A 12/1982 Childs
4,369,829 A 1/1983 Casiday
4,390,054 A 6/1983 Niibori et al.
4,399,855 A 8/1983 Volfson
4,419,982 A 12/1983 Eckels
4,436,137 A 3/1984 Charles
4,458,739 A 7/1984 Murray et al.
4,467,853 A 8/1984 Downey, Jr.
4,480,676 A 11/1984 Solomon
4,506,478 A 3/1985 Anderson
4,513,805 A 4/1985 Mase
4,530,189 A 7/1985 Randall
4,531,562 A 7/1985 Swanson
4,535,829 A 8/1985 Fukuchi
4,558,536 A 12/1985 Dunsmoor
4,586,291 A 5/1986 Swan
4,592,180 A 6/1986 Gerritsen
4,599,833 A 7/1986 Bullock
4,599,836 A 7/1986 Melcher
4,604,840 A 8/1986 Mondon
4,625,659 A 12/1986 Saelzer
4,638,844 A 1/1987 Hayashiguchi
4,649,980 A 3/1987 Kunz
4,649,981 A 3/1987 Bibeau
4,651,797 A 3/1987 Lange
4,651,940 A 3/1987 Nakamura
4,656,783 A 4/1987 Ahonen
4,658,879 A 4/1987 Van Klompenburg
4,667,441 A 5/1987 Coddens
4,671,557 A 6/1987 Lemp
4,685,175 A 8/1987 Yonovich
4,688,619 A 8/1987 Kessler et al.
4,702,297 A 10/1987 Van Klompenburg
4,726,149 A 2/1988 Tryba
4,741,488 A 5/1988 Futagawa
4,747,248 A 5/1988 Fahs
4,751,115 A 6/1988 Smith et al.
4,757,852 A 7/1988 Jentof et al.
4,762,160 A 8/1988 Bechtold et al.
4,781,235 A 11/1988 Hedstrom et al.
4,819,295 A 4/1989 Kaftan
4,821,786 A 4/1989 Johnston
4,825,921 A 5/1989 Rigter
4,830,913 A 5/1989 Ortmans et al.
4,834,160 A 5/1989 Becker
4,838,333 A 6/1989 Mottura
4,846,241 A 7/1989 Chomka et al.
4,854,364 A 8/1989 Junker
4,862,942 A 9/1989 Johnson
4,865,108 A 9/1989 Hennequin et al.
4,867,222 A 9/1989 Roman et al.
4,872,498 A 10/1989 Deblock et al.
4,884,617 A * 12/1989 Coenraets ................ E06B 9/62
160/310
4,912,879 A 4/1990 Mozuras et al.
4,915,152 A 4/1990 Magee
4,922,658 A 5/1990 Coddens
4,934,434 A 6/1990 Schnebly et al.
4,934,436 A 6/1990 Schnebly
4,934,437 A 6/1990 Kraeutler
4,935,987 A 6/1990 Sterner, Jr.
4,945,969 A 8/1990 Schnebly et al.
4,961,247 A 10/1990 Leitzel et al.
4,986,034 A 1/1991 Mozuras et al.
4,993,468 A 2/1991 Hackman et al.
4,996,814 A 3/1991 Guillemet
4,999,900 A 3/1991 Anderson
4,999,948 A 3/1991 Hodgens
5,002,112 A 3/1991 Schnebly et al.
5,012,041 A 4/1991 Sims et al.
5,012,616 A 5/1991 Martin
5,035,081 A 7/1991 Yamamoto et al.
5,044,417 A 9/1991 Bresson
5,063,638 A 11/1991 Howard et al.
5,069,013 A 12/1991 Pliml, Jr.
5,090,469 A 2/1992 Boulanger
5,092,388 A 3/1992 Evers
5,097,886 A 3/1992 Moyet-Ortiz
5,099,905 A 3/1992 Rigter
5,099,906 A 3/1992 Chigusa et al.
5,108,526 A 4/1992 Cornils et al.
5,113,922 A 5/1992 Christensen et al.
5,119,591 A 6/1992 Sterner et al.
5,121,782 A 6/1992 Renkhoff et al.
5,124,185 A 6/1992 Kerr et al.
5,131,450 A 7/1992 Lichy
5,143,138 A 9/1992 Zwart
5,163,495 A 11/1992 Lichy
5,228,491 A 7/1993 Rude et al.
5,230,738 A 7/1993 Wheeler
5,265,308 A 11/1993 May et al.
5,282,504 A 2/1994 Anderson et al.
5,301,734 A 4/1994 Opel
5,301,737 A 4/1994 Martin
5,323,831 A 6/1994 Manthei
5,339,568 A 8/1994 Hanemaayer
5,343,594 A 9/1994 Harvey
5,351,742 A 10/1994 Lichy
5,355,245 A 10/1994 Lynam
5,363,898 A 11/1994 Sprague
5,392,835 A 2/1995 Wildt
5,429,171 A 7/1995 Hamilton
5,436,064 A 7/1995 Schnegg et al.
5,445,209 A 8/1995 Lichy
5,479,979 A 1/1996 Hayashiguchi
5,496,630 A 3/1996 Hawrylko et al.
5,505,244 A 4/1996 Thumann
5,523,877 A 6/1996 Lynam
5,540,651 A 7/1996 Risch et al.
5,544,689 A 8/1996 Wegner
5,547,011 A 8/1996 Dotson et al.
5,600,974 A 2/1997 Schnegg et al.
5,601,888 A 2/1997 Fowler
5,622,414 A 4/1997 Artwohl et al.
5,628,356 A 5/1997 Marocco
5,634,508 A 6/1997 Herbst
5,655,342 A 8/1997 Guillemet et al.
5,671,790 A 9/1997 Andersen et al.
5,680,245 A 10/1997 Lynam
5,680,893 A 10/1997 Neer
5,682,710 A 11/1997 Davies et al.
5,687,506 A 11/1997 Davies et al.
5,692,349 A 12/1997 Guillemet
5,771,952 A 6/1998 Gabriel
5,778,955 A 7/1998 Chen
5,787,952 A 8/1998 Wegner
5,794,328 A 8/1998 Simone
5,794,678 A 8/1998 Beringer et al.
5,803,145 A 9/1998 Lamb
5,836,120 A 11/1998 Debower
5,836,655 A 11/1998 Laufer
5,839,234 A 11/1998 Mayer
5,850,864 A 12/1998 Decker
5,853,040 A 12/1998 Benthin

(56) References Cited

U.S. PATENT DOCUMENTS

| | | | | |
|---|---|---|---|---|
| 5,862,851 | A | 1/1999 | Stoebich et al. | |
| 5,864,419 | A | 1/1999 | Lynam | |
| 5,887,385 | A * | 3/1999 | Horner | E06B 9/581 49/197 |
| 5,887,391 | A | 3/1999 | Shoup | |
| 5,901,768 | A | 5/1999 | Herbst | |
| 5,904,200 | A | 5/1999 | Agen | |
| 5,915,443 | A | 6/1999 | Lindley, Jr. | |
| 5,918,659 | A | 7/1999 | Lee | |
| 5,923,002 | A | 7/1999 | McGrath et al. | |
| 5,930,952 | A | 8/1999 | Ricci | |
| 5,934,353 | A | 8/1999 | Buhr | |
| 5,945,182 | A | 8/1999 | Fowler et al. | |
| 5,946,857 | A | 9/1999 | Davies et al. | |
| 5,953,860 | A | 9/1999 | Morgan et al. | |
| 5,964,271 | A | 10/1999 | Lapointe | |
| 5,986,797 | A | 11/1999 | Lynam | |
| 6,005,642 | A | 12/1999 | Meisner et al. | |
| 6,015,025 | A | 1/2000 | McGrath et al. | |
| 6,015,026 | A | 1/2000 | McGrath | |
| 6,035,460 | A | 3/2000 | Borter | |
| 6,039,107 | A | 3/2000 | Pittard | |
| 6,039,390 | A | 3/2000 | Agrawal et al. | |
| 6,051,820 | A | 4/2000 | Poix et al. | |
| 6,059,007 | A | 5/2000 | Tomita | |
| 6,067,762 | A | 5/2000 | Greer et al. | |
| 6,068,802 | A | 5/2000 | Berghorn et al. | |
| 6,070,642 | A | 6/2000 | Douglas et al. | |
| 6,082,432 | A | 7/2000 | Kissinger | |
| 6,098,743 | A | 8/2000 | McGrath | |
| 6,116,323 | A | 9/2000 | Huang | |
| 6,119,756 | A | 9/2000 | Tatro | |
| 6,122,093 | A | 9/2000 | Lynam | |
| 6,123,135 | A | 9/2000 | Mathews | |
| 6,125,910 | A | 10/2000 | Pepperell et al. | |
| 6,135,186 | A | 10/2000 | Lindley, Jr. | |
| 6,155,328 | A | 12/2000 | Welfonder | |
| 6,167,936 | B1 | 1/2001 | Stover et al. | |
| 6,179,037 | B1 | 1/2001 | Tees | |
| 6,179,373 | B1 | 1/2001 | Bohm et al. | |
| 6,186,215 | B1 | 2/2001 | Deyoung et al. | |
| 6,192,631 | B1 | 2/2001 | Kenkel et al. | |
| 6,199,331 | B1 | 3/2001 | Hunt | |
| 6,209,610 | B1 | 4/2001 | Davies et al. | |
| 6,223,803 | B1 | 5/2001 | Nielsen | |
| 6,237,208 | B1 | 5/2001 | Meeth | |
| 6,256,931 | B1 | 7/2001 | Kenkel et al. | |
| 6,263,949 | B1 | 7/2001 | Guthrie, Jr. | |
| 6,267,168 | B1 | 7/2001 | Davies et al. | |
| 6,279,644 | B1 | 8/2001 | Wylie | |
| 6,283,427 | B1 | 9/2001 | Moeller et al. | |
| 6,304,363 | B1 | 10/2001 | Lynam | |
| 6,305,126 | B1 | 10/2001 | Hendrickson et al. | |
| 6,311,439 | B1 | 11/2001 | Arcati et al. | |
| 6,331,223 | B1 | 12/2001 | Wylie et al. | |
| 6,374,557 | B1 | 4/2002 | O'Donnell | |
| 6,375,165 | B1 | 4/2002 | Sherratt et al. | |
| 6,378,267 | B1 | 4/2002 | Bass | |
| 6,394,173 | B2 | 5/2002 | Ensslе | |
| 6,401,428 | B1 | 6/2002 | Glover et al. | |
| 6,405,781 | B2 | 6/2002 | Davies et al. | |
| 6,408,922 | B2 | 6/2002 | Desrochers | |
| 6,412,537 | B1 | 7/2002 | Voss et al. | |
| 6,431,618 | B1 | 8/2002 | Choo | |
| 6,446,696 | B1 | 9/2002 | Davies et al. | |
| 6,463,983 | B1 | 10/2002 | Lang | |
| 6,470,511 | B1 | 10/2002 | Smale | |
| 6,470,947 | B1 | 10/2002 | Holevas | |
| 6,478,070 | B2 | 11/2002 | Poppema | |
| 6,493,128 | B1 | 12/2002 | Agrawal et al. | |
| 6,499,527 | B1 | 12/2002 | Lindley, Jr. | |
| 6,508,292 | B1 | 1/2003 | Saperas | |
| 6,513,771 | B1 | 2/2003 | Tucker | |
| 6,591,890 | B1 | 7/2003 | Grubb et al. | |
| 6,601,633 | B2 | 8/2003 | Sun et al. | |
| 6,618,998 | B1 | 9/2003 | Thomas et al. | |
| 6,619,364 | B1 | 9/2003 | Ehrlich et al. | |
| 6,622,769 | B2 | 9/2003 | Judkins | |
| 6,629,555 | B2 | 10/2003 | Deblock et al. | |
| 6,644,380 | B2 | 11/2003 | Perich et al. | |
| 6,655,441 | B2 | 12/2003 | Wen et al. | |
| 6,655,736 | B1 | 12/2003 | Arenas | |
| 6,666,252 | B2 | 12/2003 | Welfonder | |
| 6,679,002 | B2 | 1/2004 | Davies et al. | |
| 6,684,571 | B2 | 2/2004 | Hendrickson et al. | |
| 6,688,056 | B2 | 2/2004 | Von et al. | |
| 6,691,761 | B1 | 2/2004 | Alkhoury et al. | |
| 6,701,994 | B2 | 3/2004 | Goldenberg et al. | |
| 6,722,416 | B2 * | 4/2004 | Varley | E06B 9/70 160/264 |
| 6,769,214 | B1 | 8/2004 | Kenkel et al. | |
| 6,779,580 | B2 | 8/2004 | Woodward et al. | |
| 6,814,127 | B2 | 11/2004 | Tagtow et al. | |
| 6,819,467 | B2 | 11/2004 | Lynam | |
| 6,823,924 | B2 | 11/2004 | Martin | |
| 6,851,464 | B2 | 2/2005 | Hudoba et al. | |
| 6,854,505 | B2 | 2/2005 | Grubb et al. | |
| 6,868,648 | B2 | 3/2005 | Glover et al. | |
| 6,880,612 | B2 | 4/2005 | Pylkki et al. | |
| 6,922,958 | B2 | 8/2005 | Derderian | |
| 6,938,667 | B2 | 9/2005 | Sugiyama et al. | |
| 6,942,003 | B2 | 9/2005 | Thompson | |
| 6,945,305 | B1 | 9/2005 | Limauro | |
| 6,959,748 | B2 | 11/2005 | Hudoba | |
| 6,964,290 | B2 | 11/2005 | Woodward et al. | |
| 6,977,021 | B2 | 12/2005 | Annacchino | |
| 6,991,693 | B2 | 1/2006 | Wylie et al. | |
| 7,024,821 | B2 | 4/2006 | Lu | |
| 7,025,105 | B2 | 4/2006 | Lancina | |
| 7,029,055 | B2 | 4/2006 | Bourque et al. | |
| 7,036,549 | B2 * | 5/2006 | Coenraets | E06B 9/13 160/271 |
| 7,080,676 | B2 | 7/2006 | Abelson et al. | |
| 7,082,719 | B2 | 8/2006 | Regnery | |
| 7,082,982 | B2 | 8/2006 | Eveland et al. | |
| 7,100,667 | B2 | 9/2006 | Tomita | |
| 7,108,307 | B1 | 9/2006 | Sahara et al. | |
| 7,124,803 | B2 | 10/2006 | Jin et al. | |
| 7,128,125 | B2 | 10/2006 | Harbison | |
| 7,137,429 | B2 | 11/2006 | Jelic | |
| 7,137,430 | B2 | 11/2006 | Fraczek | |
| 7,185,692 | B2 | 3/2007 | Nien et al. | |
| 7,195,053 | B2 | 3/2007 | Pylkki et al. | |
| 7,210,513 | B2 | 5/2007 | Goldenberg et al. | |
| 7,222,467 | B2 | 5/2007 | Nowell et al. | |
| 7,234,501 | B1 | 6/2007 | Park | |
| 7,246,411 | B2 | 7/2007 | Campbell et al. | |
| 7,281,561 | B2 | 10/2007 | Anderson et al. | |
| 7,287,569 | B2 | 10/2007 | Lin | |
| 7,320,637 | B2 | 1/2008 | Lack | |
| 7,322,395 | B2 | 1/2008 | Nyffenegger et al. | |
| 7,331,369 | B2 | 2/2008 | Cordova | |
| 7,389,807 | B2 * | 6/2008 | Nagare | E06B 9/13 160/273.1 |
| 7,395,850 | B2 | 7/2008 | Chino et al. | |
| 7,416,014 | B2 * | 8/2008 | Coenraets | E06B 9/581 160/273.1 |
| 7,418,806 | B2 | 9/2008 | Martineau et al. | |
| 7,487,816 | B2 | 2/2009 | Moriya et al. | |
| 7,509,773 | B2 | 3/2009 | Vornbaeumen et al. | |
| 7,516,770 | B2 | 4/2009 | Jerry | |
| 7,540,119 | B2 | 6/2009 | Milburn | |
| 7,581,775 | B2 | 9/2009 | Lekar | |
| 7,594,695 | B2 | 9/2009 | Noonan | |
| 7,617,858 | B2 | 11/2009 | Hoffmann et al. | |
| 7,631,683 | B2 | 12/2009 | Crider | |
| 7,654,300 | B2 | 2/2010 | Chigusa | |
| 7,661,226 | B2 | 2/2010 | Kibbel et al. | |
| 7,661,455 | B2 | 2/2010 | Weinbrenner | |
| 7,669,634 | B2 | 3/2010 | Sugiyama et al. | |
| 7,694,711 | B2 | 4/2010 | Okachi et al. | |
| 7,703,498 | B2 | 4/2010 | Holevas | |
| 7,712,968 | B2 | 5/2010 | Hoffman | |
| 7,718,251 | B2 | 5/2010 | Huntress et al. | |

(56) References Cited

U.S. PATENT DOCUMENTS 7,726,377 B2 6/2010 Okachi
7,730,689 B2 6/2010 Figueroa-Morales
7,730,925 B1 6/2010 Pereira
7,730,926 B2 6/2010 Moriya et al.
7,735,540 B2 6/2010 Armstrong
7,743,814 B2 6/2010 Woodward et al.
7,765,741 B2 8/2010 Miller et al.
7,770,625 B2 8/2010 Lukos
7,798,568 B2 9/2010 Keller
7,802,607 B2 9/2010 Crider
7,819,167 B2 10/2010 Morin
7,823,342 B1 11/2010 Van et al.
7,861,473 B1 1/2011 Green
7,861,761 B2 1/2011 Martineau et al.
7,891,398 B2 2/2011 Chino et al.
7,934,350 B2 5/2011 Koutsoukos
7,967,052 B2 6/2011 Lin
7,984,744 B2 7/2011 Karasawa et al.
8,000,759 B2 8/2011 Huang
8,006,736 B2 8/2011 Hoffmann et al.
8,011,413 B2 9/2011 Poppema
8,016,013 B2 9/2011 Horvath
8,016,014 B2 9/2011 Crider et al.
8,035,893 B2 10/2011 Creel
8,037,923 B2 10/2011 Alkhoury et al.
8,042,598 B2 10/2011 Bredemus et al.
8,109,317 B2 * 2/2012 Bostyn .................... E06B 9/581 160/271
8,156,994 B2 4/2012 Armstrong
8,167,020 B2 5/2012 Shanahan et al.
8,169,698 B1 5/2012 Robinson
8,191,606 B2 6/2012 Edlin
8,196,638 B2 6/2012 Roberts et al.
8,215,072 B2 7/2012 Gorman
8,215,073 B2 7/2012 Gorman et al.
8,220,520 B2 7/2012 Lukos
8,235,086 B2 8/2012 Smith
8,258,993 B2 9/2012 Inoue et al.
8,322,396 B2 12/2012 Andersen et al.
8,325,352 B2 12/2012 Franco et al.
8,347,939 B2 1/2013 Brabeck et al.
8,358,464 B1 1/2013 Risher
8,376,019 B2 2/2013 Van et al.
8,381,848 B2 2/2013 Asbach et al.
8,393,080 B2 3/2013 Ballard et al.
8,397,788 B2 3/2013 Weinbrenner et al.
8,419,119 B2 * 4/2013 Nakamura ............. B60J 7/0015 160/265
8,439,098 B1 5/2013 Jones et al.
8,439,100 B2 5/2013 Panseri et al.
8,464,471 B2 6/2013 Bertram
8,474,510 B2 7/2013 Nellen et al.
8,528,623 B2 9/2013 Roberts
8,555,572 B1 10/2013 Bingham et al.
8,579,011 B2 11/2013 Katada
8,584,410 B2 11/2013 Furgerson et al.
8,601,749 B2 12/2013 Von et al.
8,607,839 B2 12/2013 Berger
8,613,168 B2 12/2013 Von et al.
8,615,936 B2 12/2013 Von et al.
8,616,260 B2 12/2013 Zhang
8,622,112 B2 1/2014 Tremaine et al.
8,641,105 B2 2/2014 Goodman et al.
8,656,978 B2 2/2014 Goldenberg et al.
8,714,230 B2 5/2014 Marszalek et al.
8,733,041 B2 5/2014 Phipps
8,792,885 B2 7/2014 Chen et al.
8,810,909 B2 8/2014 Risher
8,833,034 B2 9/2014 Gorman et al.
8,833,426 B2 9/2014 Ebbesen et al.
8,851,146 B2 10/2014 Dwarka
8,869,870 B2 10/2014 Wieczorek et al.
8,887,789 B2 11/2014 Tremaine et al.
8,893,434 B1 11/2014 Konstantin
8,910,424 B2 12/2014 Harris
8,919,418 B2 12/2014 Carvallo
8,943,769 B2 2/2015 Snderkr et al.
8,944,134 B2 2/2015 Ballard et al.
8,955,254 B1 2/2015 Ewoldt
8,955,903 B2 2/2015 Park et al.
8,991,468 B2 3/2015 Bolton, III
8,997,831 B2 4/2015 Lin
9,004,143 B2 4/2015 Wilson
9,016,009 B2 4/2015 Snderkr et al.
9,016,010 B2 4/2015 Snderkr et al.
9,022,089 B1 5/2015 Dau
9,062,494 B2 6/2015 Chen
9,110,362 B2 8/2015 Risher
9,115,535 B2 8/2015 Blais
9,140,058 B1 9/2015 James
9,140,062 B2 9/2015 Cuatepotzo et al.
9,151,109 B2 10/2015 Kawai et al.
9,158,172 B2 10/2015 Sbar et al.
9,163,449 B2 10/2015 Weiss et al.
9,169,691 B2 10/2015 Berger
9,206,600 B2 12/2015 Von et al.
9,222,304 B2 * 12/2015 Casey ........................ E06B 9/13
9,247,840 B2 2/2016 Diamond et al.
9,249,621 B2 2/2016 Dwarka
9,255,438 B2 2/2016 Pardue et al.
9,273,763 B2 3/2016 Evensen
9,284,729 B2 3/2016 Von et al.
9,284,770 B2 3/2016 Sprague
9,303,423 B2 4/2016 Cadogan et al.
9,303,448 B2 4/2016 Olkin
9,316,042 B2 4/2016 Goldenberg
9,322,208 B2 4/2016 Matta
9,347,258 B2 5/2016 Dwarka
9,351,599 B2 5/2016 Roberts
9,353,567 B2 5/2016 Pardue et al.
9,358,716 B2 6/2016 Huntress et al.
9,395,615 B2 7/2016 Risher
9,402,334 B2 7/2016 Coico et al.
9,416,587 B2 8/2016 Colson et al.
9,433,308 B1 9/2016 Kalinski
9,447,631 B2 9/2016 Christie
9,458,666 B2 10/2016 Murray
9,469,178 B2 10/2016 Lee
9,470,040 B2 10/2016 Hall et al.
9,487,986 B2 11/2016 Okachi et al.
9,487,999 B2 11/2016 Seuberling et al.
9,488,000 B2 11/2016 Kirby et al.
9,489,834 B2 11/2016 Hall et al.
9,492,037 B2 11/2016 Kee et al.
9,506,288 B2 11/2016 Hall et al.
9,512,666 B2 12/2016 Reyher et al.
9,512,673 B2 12/2016 Dibben et al.
9,514,638 B2 12/2016 Hall et al.
9,518,423 B2 12/2016 Seuberling et al.
9,540,871 B2 1/2017 Hall et al.
9,546,515 B2 1/2017 Hall et al.
9,556,670 B2 1/2017 Farntrog
9,561,456 B2 2/2017 Simmons
9,562,390 B2 2/2017 Hall et al.
9,569,955 B2 2/2017 Hall et al.
9,574,392 B2 2/2017 Alexander
9,574,395 B2 2/2017 Hall et al.
9,580,954 B2 2/2017 Pardue et al.
9,587,425 B2 3/2017 Free et al.
9,587,430 B2 3/2017 Colson et al.
9,605,476 B2 3/2017 Hall et al.
9,624,720 B2 4/2017 Hall et al.
9,624,721 B2 4/2017 Rubinoff
9,631,423 B2 4/2017 Hornung
9,652,977 B2 5/2017 Hall et al.
9,751,386 B1 9/2017 Attig
9,752,373 B2 9/2017 Pardue et al.
9,759,010 B2 9/2017 Hall et al.
9,790,732 B2 10/2017 Free et al.
9,810,020 B2 11/2017 Adams et al.
9,889,726 B2 2/2018 Umeki et al.
9,932,769 B2 4/2018 Woolery
10,012,021 B2 7/2018 Hornung
10,041,294 B2 8/2018 Van Loosbroek

(56) References Cited

U.S. PATENT DOCUMENTS 11,643,864 B2 5/2023 Hoogland et al.
11,643,865 B2 5/2023 Hoogland et al.
2001/0000878 A1 5/2001 Davies et al.
2001/0011579 A1 8/2001 Davies et al.
2001/0027621 A1 10/2001 Davies et al.
2001/0030028 A1 10/2001 Poppema
2001/0035269 A1 11/2001 Judkins
2002/0023387 A1 2/2002 Hendrickson et al.
2002/0041424 A1 4/2002 Lynam
2002/0121056 A1 9/2002 Von et al.
2002/0179258 A1 12/2002 Welfonder
2003/0014920 A1 1/2003 Lu
2003/0019172 A1 1/2003 Martin
2003/0019181 A1 1/2003 Martin
2003/0029546 A1 2/2003 Wylie et al.
2003/0066614 A1 4/2003 Sun et al.
2003/0075281 A1 4/2003 Goldenberg et al.
2003/0079844 A1 5/2003 Deblolck et al.
2003/0106648 A1 6/2003 Lancina
2003/0127201 A1 7/2003 Perich et al.
2003/0150569 A1 8/2003 Pylkki et al.
2003/0168184 A1 9/2003 Wen et al.
2003/0178155 A1 9/2003 Fraczek
2004/0040673 A1 3/2004 Jelic
2004/0064986 A1 4/2004 Anderson
2004/0084157 A1 5/2004 Thomas et al.
2004/0100121 A1 5/2004 Bourque et al.
2004/0103999 A1 6/2004 Grubb et al.
2004/0107655 A1 6/2004 Hudoba
2004/0140061 A1 7/2004 Woodward et al.
2004/0144498 A1 7/2004 Hudoba et al.
2004/0154753 A1 8/2004 Tagtow et al.
2004/0182522 A1 9/2004 Strand et al.
2004/0188042 A1 9/2004 Pylkki et al.
2004/0200160 A1 10/2004 Derderian
2004/0211134 A1 10/2004 Glover et al.
2004/0211528 A1 10/2004 Jin et al.
2004/0216849 A1 11/2004 Goldenberg et al.
2004/0216852 A1 11/2004 Woodward et al.
2004/0226221 A1 11/2004 Regnery
2004/0238131 A1 12/2004 Eveland et al.
2004/0261958 A1 12/2004 Sugiyama et al.
2005/0000760 A1 1/2005 Zangirolami
2005/0005545 A1 1/2005 Jerry
2005/0006037 A1 1/2005 Annacchino
2005/0016695 A1 1/2005 Thompson
2005/0016696 A1 1/2005 Tomita
2005/0066610 A1 3/2005 Nowell et al.
2005/0121152 A1 6/2005 Weinbrenner
2005/0132532 A1 6/2005 Campbell et al.
2005/0155726 A1 7/2005 Nien et al.
2005/0173075 A1 8/2005 Abelson et al.
2005/0211397 A1* 9/2005 Coenraets ............... E06B 9/582 160/271
2005/0230065 A1 10/2005 Moriya et al.
2005/0257496 A1 11/2005 Martineau et al.
2005/0257899 A1 11/2005 Lee et al.
2005/0262783 A1 12/2005 Milburn
2005/0269041 A1 12/2005 Anderson et al.
2005/0274462 A1 12/2005 Nyffenegger et al.
2006/0048905 A1 3/2006 Woodward et al.
2006/0060313 A1 3/2006 Lukos
2006/0064934 A1 3/2006 Vornbaumen et al.
2006/0088236 A1 4/2006 E. Hoffman
2006/0108074 A1 5/2006 Morin
2006/0137836 A1 6/2006 Harbison
2006/0144530 A1* 7/2006 Nagare ..................... E06B 9/13 160/271
2006/0150514 A1 7/2006 Miller et al.
2006/0150561 A1 7/2006 Van et al.
2006/0179719 A1 8/2006 Christie
2006/0214463 A1 9/2006 Sahara et al.
2006/0249264 A1 11/2006 Lin
2006/0272781 A1 12/2006 Cordova
2006/0283564 A1 12/2006 Poppema
2007/0029049 A1 2/2007 Martineau
2007/0033880 A1 2/2007 Holevas
2007/0039698 A1 2/2007 Chino et al.
2007/0135034 A1 6/2007 Lack
2007/0137796 A1 6/2007 Woodward et al.
2007/0144685 A1 6/2007 Chigusa
2007/0181273 A1 8/2007 Koutsoukos
2007/0193697 A1 8/2007 Horvath
2007/0199665 A1 8/2007 Studney
2007/0256800 A1 11/2007 Armstrong
2007/0272368 A1 11/2007 Hoffmann et al.
2007/0284052 A1 12/2007 Thomas et al.
2008/0030853 A1 2/2008 Creel
2008/0053623 A1 3/2008 Goldenberg et al.
2008/0053630 A1 3/2008 Lekar
2008/0060771 A1 3/2008 Sugiyama et al.
2008/0093037 A1* 4/2008 Kraeutler .................. E06B 9/58 160/271
2008/0115894 A1 5/2008 Cech et al.
2008/0135189 A1 6/2008 Okachi et al.
2008/0168637 A1 7/2008 Ballard et al.
2008/0178548 A1 7/2008 Figueroa-Morales
2008/0210385 A1 9/2008 Sawyers et al.
2008/0264573 A1 10/2008 Beck et al.
2008/0284217 A1 11/2008 Noonan
2008/0289775 A1 11/2008 Lukos
2009/0025886 A1 1/2009 Crider
2009/0025889 A1 1/2009 Crider
2009/0050278 A1 2/2009 Weinbrenner et al.
2009/0068999 A1 3/2009 Chen et al.
2009/0084507 A1 4/2009 Tescher
2009/0104829 A1 4/2009 Bredemus et al.
2009/0115203 A1 5/2009 Thomas et al.
2009/0120004 A1 5/2009 Cobb
2009/0145047 A1 6/2009 Gorman
2009/0145048 A1 6/2009 Gorman et al.
2009/0165964 A1 7/2009 Harbison
2009/0178771 A1 7/2009 Lin
2009/0183844 A1 7/2009 Alkhoury et al.
2009/0199978 A1 8/2009 Crider et al.
2009/0199983 A1 8/2009 Edlin
2009/0251714 A1 10/2009 Franco et al.
2009/0270133 A1 10/2009 Huang
2010/0018657 A1 1/2010 Hoffmann et al.
2010/0032991 A1 2/2010 Keller
2010/0116444 A1 5/2010 Andersen et al.
2010/0116449 A1 5/2010 Ebbesen et al.
2010/0134339 A1 6/2010 Inoue et al.
2010/0136317 A1 6/2010 Huntress et al.
2010/0170645 A1 7/2010 Lin
2010/0186908 A1 7/2010 Meadows et al.
2010/0205881 A1 8/2010 Soenderkaer et al.
2010/0206364 A1 8/2010 Armstrong
2010/0218429 A1 9/2010 Shanahan et al.
2010/0229468 A1 9/2010 Allen et al.
2010/0252210 A1 10/2010 Roberts et al.
2010/0258395 A1 10/2010 Busi
2010/0269432 A1 10/2010 Furgerson et al.
2011/0061817 A1 3/2011 Smith
2011/0061822 A1 3/2011 Tremaine et al.
2011/0083371 A1 4/2011 Hughes et al.
2011/0094686 A1 4/2011 Kee et al.
2011/0108209 A1 5/2011 Thomas et al.
2011/0114268 A1 5/2011 Brabeck et al.
2011/0114272 A1 5/2011 Roberts
2011/0126476 A1 6/2011 Bertram
2011/0162167 A1 7/2011 Blais
2011/0167729 A1 7/2011 Panseri et al.
2011/0198042 A1 8/2011 Lee
2011/0199519 A1 8/2011 Yamauchi
2011/0209837 A1 9/2011 Wieczorek et al.
2011/0253571 A1 10/2011 Rothbaum
2011/0296774 A1 12/2011 Tremaine et al.
2012/0025685 A1 2/2012 Clegg et al.
2012/0055106 A1 3/2012 Phipps
2012/0061031 A1 3/2012 Zhang
2012/0061036 A1 3/2012 Agbozouhoue
2012/0118651 A1 5/2012 Asbach et al.
2012/0186758 A1 7/2012 Katada

(56) References Cited

U.S. PATENT DOCUMENTS

| | | | |
|---|---|---|---|
| 2012/0199294 | A1 | 8/2012 | Fayette et al. |
| 2012/0206661 | A1 | 8/2012 | Risher |
| 2012/0241108 | A1 | 9/2012 | Marszalek et al. |
| 2012/0267059 | A1 | 10/2012 | Tsou |
| 2012/0273641 | A1 | 11/2012 | Gorman et al. |
| 2012/0312484 | A1 | 12/2012 | Harris |
| 2012/0317894 | A1 | 12/2012 | Von et al. |
| 2012/0317895 | A1 | 12/2012 | Von et al. |
| 2012/0317899 | A1 | 12/2012 | Von et al. |
| 2013/0000201 | A1 | 1/2013 | Alexander |
| 2013/0000224 | A1 | 1/2013 | Von et al. |
| 2013/0000232 | A1 | 1/2013 | Weiss et al. |
| 2013/0038092 | A1 | 2/2013 | Rockelmann et al. |
| 2013/0048229 | A1 | 2/2013 | Dwarka |
| 2013/0056164 | A1 | 3/2013 | Kawai et al. |
| 2013/0068400 | A1 | 3/2013 | Dwarka |
| 2013/0075048 | A1 | 3/2013 | Berger |
| 2013/0094906 | A1 | 4/2013 | Rijlaarsdam |
| 2013/0139976 | A1 | 6/2013 | Carvallo |
| 2013/0139977 | A1 | 6/2013 | Ballard et al. |
| 2013/0141783 | A1 | 6/2013 | Risher |
| 2013/0160954 | A1 | 6/2013 | Bolton, III |
| 2013/0187403 | A1 | 7/2013 | Park et al. |
| 2013/0199737 | A1 | 8/2013 | Wilson |
| 2013/0212947 | A1 | 8/2013 | Goldenberg |
| 2013/0220559 | A1 | 8/2013 | Dwarka |
| 2013/0269883 | A1 | 10/2013 | Dwarka |
| 2013/0333847 | A1 | 12/2013 | Casseri et al. |
| 2014/0000820 | A1 | 1/2014 | Diamond et al. |
| 2014/0007720 | A1 | 1/2014 | Evensen |
| 2014/0041814 | A1 | 2/2014 | Roberts |
| 2014/0060758 | A1 | 3/2014 | Cuatepotzo et al. |
| 2014/0076507 | A1 | 3/2014 | Dibben et al. |
| 2014/0090806 | A1 | 4/2014 | Coico et al. |
| 2014/0133005 | A1 | 5/2014 | Sbar et al. |
| 2014/0157696 | A1 | 6/2014 | Reyher et al. |
| 2014/0157720 | A1 | 6/2014 | Von et al. |
| 2014/0182794 | A1 | 7/2014 | Berger |
| 2014/0251553 | A1 | 9/2014 | Farntrog |
| 2014/0299281 | A1 | 10/2014 | Colson et al. |
| 2014/0305053 | A1 | 10/2014 | Snderkr et al. |
| 2014/0305054 | A1 | 10/2014 | Snderkr et al. |
| 2014/0305602 | A1 | 10/2014 | Kirby et al. |
| 2014/0311690 | A1 | 10/2014 | Camps |
| 2014/0352240 | A1 | 12/2014 | Matta |
| 2014/0360000 | A1 | 12/2014 | Risher |
| 2014/0374036 | A1 | 12/2014 | Chen |
| 2015/0047263 | A1 | 2/2015 | Aguayo |
| 2015/0068691 | A1 | 3/2015 | Thomas et al. |
| 2015/0079363 | A1 | 3/2015 | Free et al. |
| 2015/0096232 | A1 | 4/2015 | Cadogan et al. |
| 2015/0107170 | A1 | 4/2015 | Olkin |
| 2015/0226001 | A1 | 8/2015 | Adams et al. |
| 2015/0240551 | A1 | 8/2015 | Murray |
| 2015/0267459 | A1 | 9/2015 | Sprague |
| 2015/0284990 | A1 | 10/2015 | Hall et al. |
| 2015/0284991 | A1 | 10/2015 | Hall et al. |
| 2015/0284992 | A1 | 10/2015 | Hall et al. |
| 2015/0284993 | A1 | 10/2015 | Hall et al. |
| 2015/0284996 | A1 | 10/2015 | Hall et al. |
| 2015/0284997 | A1 | 10/2015 | Hall et al. |
| 2015/0284998 | A1 | 10/2015 | Hall et al. |
| 2015/0285535 | A1 | 10/2015 | Hall et al. |
| 2015/0288316 | A1 | 10/2015 | Hall et al. |
| 2015/0300081 | A1 | 10/2015 | Zhang |
| 2015/0337592 | A1 | 11/2015 | Rubinoff |
| 2015/0345209 | A1 | 12/2015 | Hornung |
| 2015/0345213 | A1 | 12/2015 | Hall et al. |
| 2015/0345218 | A1 | 12/2015 | Hall et al. |
| 2015/0348401 | A1 | 12/2015 | Hall et al. |
| 2015/0375152 | A1 | 12/2015 | Simmons |
| 2015/0376938 | A1 | 12/2015 | Pardue et al. |
| 2016/0040472 | A1 | 2/2016 | Seuberling et al. |
| 2016/0040477 | A1 | 2/2016 | Seuberling et al. |
| 2016/0096417 | A1 | 4/2016 | Lee |
| 2016/0108663 | A1 | 4/2016 | Pardue et al. |
| 2016/0123074 | A1 | 5/2016 | Anderson |
| 2016/0273261 | A1 | 9/2016 | Pardue et al. |
| 2016/0369555 | A1 | 12/2016 | Riemelmoser et al. |
| 2017/0028693 | A1 | 2/2017 | Free et al. |
| 2017/0044825 | A1 | 2/2017 | Zhang |
| 2017/0051557 | A1 | 2/2017 | Hall et al. |
| 2017/0130515 | A1 | 5/2017 | Pardue et al. |
| 2017/0130527 | A1 | 5/2017 | Riemelmoser et al. |
| 2017/0159356 | A1 | 6/2017 | Anderson |
| 2017/0211325 | A1 | 7/2017 | Riemelmoser et al. |
| 2017/0275944 | A1 | 9/2017 | LaPlaca |
| 2018/0003256 | A1 | 1/2018 | Downey |
| 2018/0010387 | A1 | 1/2018 | Woolery |
| 2019/0226270 | A1 | 7/2019 | Hoogland et al. |
| 2019/0284867 | A1 | 9/2019 | Hoogland et al. |
| 2020/0173231 | A1* | 6/2020 | Drifka ..................... E06B 9/581 |
| 2021/0131177 | A1 | 5/2021 | Vande Haar |
| 2021/0238919 | A1 | 8/2021 | Vande Haar et al. |
| 2022/0356758 | A1* | 11/2022 | Lewan ...................... E06B 9/13 |

FOREIGN PATENT DOCUMENTS

| | | | |
|---|---|---|---|
| CA | 1162713 | A | 2/1984 |
| CA | 1303480 | C | 6/1992 |
| CA | 1324535 | C | 11/1993 |
| CA | 2025837 | C | 5/1994 |
| CA | 2008484 | C | 10/1995 |
| CA | 2125517 | C | 10/1996 |
| CA | 2164252 | C | 2/2000 |
| CA | 2231298 | C | 1/2002 |
| CA | 2219946 | C | 12/2002 |
| CA | 2218640 | C | 2/2003 |
| CA | 2542245 | A1 | 4/2003 |
| CA | 2393077 | C | 7/2004 |
| CA | 2249147 | C | 10/2005 |
| CA | 2512125 | A1 | 1/2006 |
| CA | 2359549 | C | 4/2006 |
| CA | 2217270 | C | 5/2006 |
| CA | 2257358 | C | 9/2007 |
| CA | 2458913 | C | 12/2007 |
| CA | 2629261 | A1 | 10/2008 |
| CA | 2347510 | C | 4/2009 |
| CA | 2396907 | C | 8/2009 |
| CA | 2588978 | C | 3/2010 |
| CA | 2628601 | C | 9/2011 |
| CA | 2455459 | C | 12/2011 |
| CA | 2568636 | C | 7/2012 |
| CA | 2490815 | C | 10/2012 |
| CA | 2785882 | C | 6/2013 |
| CA | 2701321 | C | 10/2013 |
| CA | 2507558 | C | 1/2014 |
| CA | 2762920 | C | 1/2014 |
| CA | 2565470 | C | 8/2014 |
| CA | 2579234 | C | 8/2014 |
| CA | 2766911 | C | 1/2015 |
| CA | 2670098 | C | 10/2015 |
| CA | 2758450 | C | 10/2016 |
| CA | 2805215 | C | 8/2017 |
| CA | 2832714 | C | 10/2017 |
| JP | 09-013843 | A | 1/1997 |
| JP | 2014-214465 | A | 11/2014 |
| WO | 93/18692 | A1 | 9/1993 |
| WO | 97/34069 | A1 | 9/1997 |
| WO | 2005/086893 | A2 | 9/2005 |
| WO | 2006/133556 | A1 | 12/2006 |
| WO | 2009/065403 | A1 | 5/2009 |
| WO | 2013/057744 | A1 | 4/2013 |
| WO | 2014/059998 | A1 | 4/2014 |
| WO | 2014/125509 | A1 | 8/2014 |
| WO | 2014/138567 | A1 | 9/2014 |
| WO | 2016/015084 | A1 | 2/2016 |
| WO | 2018/232439 | A1 | 12/2018 |

* cited by examiner

SCREEN EDGE RETENTION AND SCREEN RETHREADING FEATURES FOR A HIDDEN SCREEN ASSEMBLY AND A FENESTRATION ASSEMBLY

CROSS REFERENCE TO RELATED APPLICATION

This application is a Divisional application that claims priority to U.S. patent application Ser. No. 16/222,416, filed Dec. 17, 2018, which claims the benefit of U.S. Provisional Application No. 62/620,876 filed Jan. 23, 2018, U.S. Provisional Application No. 62/620,877 filed Jan. 23, 2018, and U.S. Provisional Application No. 62/687,322 filed Jun. 20, 2018, each of which is incorporated herein by reference in its entirety.

TECHNICAL FIELD

The present disclosure relates generally to fenestration assemblies. Specifically, the disclosure relates to fenestration assemblies including a hidden screen assembly.

BACKGROUND

Fenestration assemblies that include moveable glass panels can also include a screen mounted in a fixed position to keep out insects or other pests, more colloquially known as "bugs." In some cases, the screen can be removed when not needed. However, in both cases, when screen is installed, viewing through at least one of the glass panels includes viewing through the screen, somewhat obscuring the view through the glass panel. Over time the screen can be continuously exposed to the elements, leading to an accumulation of airborne detritus on the screen, further obscuring the view.

SUMMARY

Various aspects of the disclosure relate to features for providing a hidden, actuatable screen that may move up and down with one or both sashes of a window. In various examples, the screen(s) are hidden (e.g., in the unit head and/or sill) and may be drawn or pulled out with the closing and opening action of the sash(es).

According to one example, ("Example 1"), a fenestration assembly includes a sash, a frame surrounding the sash, and at least one screen assembly mounted in at least one of: the top portion (e.g., head) and the bottom portion (e.g., sill) of the frame. In particular, the frame includes a top portion (e.g., head), a bottom portion (e.g., sill), and two jambs connecting the top portion to the bottom portion. The sash is slideably engaged with the two jambs. Each of the two jambs form first slots extending lengthwise along at least a portion of the jamb between the top portion and the bottom portion. The first slots can each include a screen edge retention feature extending along a portion of the first slots. The at least one screen assembly (one attached to each or both of the sill and/or head) includes a roller assembly substantially hidden from view, a screen material attached to the roller assembly, and a plurality of raised features associated with the screen material edges. An end of the screen material is coupled to the sash, where the screen assembly is configured to wind the screen material around the roller assembly and to permit the screen material to unwind from the roller assembly under tension applied to the end of the screen material by moving the sash away from the roller assembly. Edges of the screen material extend into the first slots of each of the two jambs and are configured to interact with the edge retention features of the jambs to hold the screen in an operative position between the frame and the sash. In various examples, the plurality of raised features are attached to each of the edges of the screen material, with each extending along a portion of a respective edge of the screen material. The raised features are configured to engage the screen edge retention features and retain each of the edges of the screen material at least partially within the first slot of each of the two jambs.

According to another example, ("Example 2") further to Example 1, the screen edge retaining features do not extend along a portion of the first slots adjacent to the bottom portion when the screen assembly is mounted in the bottom portion or along a portion of the first slots adjacent to the top portion when the screen assembly is mounted in the top portion.

According to another example, ("Example 3") further to either of Examples 1 or 2, at least one of the raised features attached to each of the edges of the screen material is adjacent to the end of the screen material.

According to another example, ("Example 4") further to any of Examples 1-3, the plurality of raised features includes a flat hook including a flexible material.

According to another example, ("Example 5") further to any of Examples 1-3, the plurality of raised features includes a flexible strip having two ends, the flexible strip being attached to the edge of the screen material at the two ends and unattached to the edge of the screen material between the two ends forming a raised hump.

According to another example, ("Example 6") further to of Examples 1-5, the at least one screen assembly further includes a control bar attached to the end of the screen material, the control bar connecting the end of the screen material to the sash.

According to another example, ("Example 7") further to Example 6, the control bar is selectively detachable from the sash.

According to another example, ("Example 8") further to any of Examples 1-7, the sash is a first sash, and the fenestration assembly further includes a second sash and each of the two jambs further form second slots extending lengthwise along at least a portion of the jamb between the top portion and the bottom portion. The second sash is slideably engaged with the two jambs. The at least one screen assembly is a first screen assembly and a second screen assembly. The first screen assembly is mounted in the bottom (e.g., sill) portion. The second screen assembly is mounted in the top (e.g., head) portion. The edges of the screen material of the second screen assembly extend into the second slots of each of the two jambs.

According to another example, ("Example 9") further to any of Examples 1-8, the edges of the screen material included folded and fused portions of the screen material.

According to another example, ("Example 10"), a fenestration assembly includes at least one sash, a frame surrounding the at least one sash, and at least one screen assembly. The at least one sash includes an upper rail, a lower rail, two stiles connecting the upper rail to the lower rail, and a window pane surrounded by the upper rail, the lower rail, and the two stiles. The frame includes a top portion, a bottom portion, and two jambs connecting the top portion to the bottom portion. Each of the two jambs forms first slots extending lengthwise along at least a portion of the jamb between the top portion and the bottom portion. The sash is slideably engaged with the two jambs. The least one screen assembly is mounted in at least one of: the top portion (e.g., head) or the bottom portion (e.g., sill). The at least one screen assembly includes a roller assembly substantially hidden from view and a screen material attached to the roller assembly. The screen assembly is configured to wind the screen material around the roller assembly and to permit the screen material to unwind from the roller assembly under tension applied to an end of the screen material. Edges of the screen material extend into the first slots of each of the two jambs. The edges include folded and fused portions of the screen material. The end of the screen material is coupled to the lower rail of the sash when the screen assembly is mounted in the bottom portion, and the end of the screen material is coupled to the upper rail of the sash when the screen assembly is mounted in the top portion.

According to another example, ("Example 11") further to Example 10, the at least one screen assembly further includes a plurality of raised features and the first slots of each of the two jambs each include a screen edge retention feature extending along a portion of the first slots. At least one of the plurality of raised features is attached to each of the edges of the screen material and extends along a portion of the edges of the screen material. The screen edge retention features are configured to engage the raised features and retain the edges of the screen material at least partially within the first slots.

According to another example, ("Example 12") further to Example 11, the screen edge retaining features do not extend along a portion of the first slots adjacent to the bottom portion when the screen assembly is mounted in the bottom portion or along a portion of the first slots adjacent to the top portion when the screen assembly is mounted in the top portion.

According to another example, ("Example 13") further to either of Examples 11 or 12, at least one of the raised features attached to each of the edges of the screen material is adjacent to the end of the screen material.

According to another example, ("Example 14") further to any of Examples 11-13, the plurality of raised features includes a flat hook including a flexible material.

According to another example, ("Example 15") further to any of Examples 11-13, the plurality of raised features includes a flexible strip having two ends. The flexible strip is attached to the edge of the screen material at the two ends and remains unattached to the edge of the screen material between the two ends forming a raised hump.

According to another example, ("Example 16") further to any of Examples 10-15, the at least one screen assembly further includes a control bar attached to the end of the screen material, the control bar connecting the end of the screen material to the lower rail of the sash when the at least one screen assembly is mounted in the bottom portion, and the control bar connecting the end of the screen material to the upper rail of the sash when the at least one screen assembly is mounted in the top portion.

According to another example, ("Example 17") further to Example 16, the control bar is selectively detachable from the lower rail or the upper rail.

According to another example, ("Example 18") further to Examples 10-17, the at least one sash is a first sash and a second sash and each of the two jambs further form second slots extending lengthwise along at least a portion of the jamb between the top portion and the bottom portion. The second sash is slideably engaged with the two jambs. The at least one screen assembly is a first screen assembly and a second screen assembly. The first screen assembly is mounted in the bottom portion. The second screen assembly is mounted in the top portion. The edges of the screen material of the second screen assembly extend into the second slots of each of the two jambs.

According to another example, ("Example 19"), a screen assembly for a fenestration assembly including a frame and a sash slideably engaged with the frame includes a roller assembly, a screen material attached to the roller assembly, and a plurality of raised features. The roller assembly is configured to attach to the frame and be substantially hidden from view. An end of the screen material is configured to be coupled to the sash. The screen assembly is configured to wind the screen material around the roller assembly and to permit the screen material to unwind from the roller assembly under tension applied to the end of the screen material by moving the sash away from the roller assembly. Edges of the screen material are configured to extend into slots extending along the frame. At least one of the plurality of raised features is attached to each of the edges of the screen material and extends along a portion of the edges of the screen material. The raised features are configured to engage screen edge retention features within the slots of the frame and retain each of the edges of the screen material at least partially within the slots of the frame.

According to another example, ("Example 20") further to Example 19, the edges of the screen material include folded and fused portions of the screen material.

According to another example, ("Example 21"), a fenestration assembly includes a sash, a frame surrounding the sash, and a screen assembly. The frame includes a head, a sill, and two jambs connecting the head to the sill. The sash is slideably engaged with the two jambs. Each of the two jambs includes a first slot and a rethreading slot. The first slot extends lengthwise along a portion of the jamb from the sill and toward the head. The first slot includes a chamfered portion and a transition portion. The chamfered portion is at an end of the first slot adjacent to the sill. The chamfered portion is on a surface of the first slot nearest an interior-facing surface of the jamb. The transition portion is between the chamfered portion and a remainder of the first slot. The rethreading slot is disposed at an end of the jamb adjacent to the sill at the interior-facing surface of the jamb. The screen assembly is mounted in the sill. The screen assembly includes a roller assembly substantially hidden from view and a screen material attached to the roller assembly. An end of the screen material is coupled to the sash. The screen assembly is configured to wind the screen material around the roller assembly and to permit the screen material to unwind from the roller assembly. Edges of the screen material extend into the first slots of each of the two jambs.

According to another example, ("Example 22") further to Example 21, a height of the rethreading slot is equal to or less than approximately 1.5 inches high.

According to another example, ("Example 23") further to Example 21, the transition portion includes a surface curvature that blends chamfered portion with the remainder of the first slot.

According to another example, ("Example 24") further to Example 23, the frame further includes a screen edge retention feature and the screen assembly further includes a plurality of raised features. The screen edge retention feature is disposed within, and extends along at least a portion of, the remainder of the first slot. The at least one of the plurality of raised features are attached to each of the edges of the screen material and extend along a portion of the edges of the screen material. The raised features are configured to engage the screen edge retention features and retain each of the edges of the screen material at least partially within the first slot of each of the two jambs.

According to another example, ("Example 25") further to Example 24, each of the two jambs further includes a low friction material strip disposed within, and extending along, each of the first slots opposite the screen edge retention feature. The low friction material strip including a resilient portion projecting toward the screen edge retention feature. And, the resilient portion not extending beyond an end of the screen edge retention feature nearest the sill.

According to another example, ("Example 26"), a method for operating a screen assembly disposed within a fenestration assembly, the screen assembly including screen material attached to a roller assembly, edges of the screen material disposed within first slots of the fenestration assembly, the edges including a raised feature and the first slots each including a screen edge retaining feature includes opening a sash within the fenestration assembly, the sash coupled to an end of the screen assembly to extend the screen material from the roller assembly, the raised features engaging the screen edge retaining features to retain the screen edges within the first slots; and closing the sash within the fenestration to retract the screen material around the roller assembly, wherein any the screen material pulled out of the first slots returns to the first slots through rethreading slots at an interior-facing surface of the fenestration assembly adjacent to the roller assembly, the first slots each including a chamfered portion at an end of the first slot adjacent to the roller assembly, the chamfered portion on a surface of the first slot nearest the interior-facing surface of the fenestration assembly, and a transition portion between the chamfered portion and a remainder of the first slot.

According to another example, ("Example 27"), a fenestration assembly includes a lower sash, an upper sash, a frame surrounding the upper sash and the lower sash, at least one screen assembly, and check rail seal. The lower sash includes a first upper rail, a first lower rail, two first stiles connecting the first upper rail to the first lower rail and a first window pane surrounded by the first upper rail, the first lower rail, and the two first stiles. The upper sash includes a second upper rail, a second lower rail, two second stiles connecting the second upper rail to the second lower rail, and a second window pane surrounded by the second upper rail, the second lower rail, and the two second stiles. The includes a head, a sill, and two jambs connecting the head to the sill. Each of the two jambs form first slots and second slots. The first slots and the second slots extend lengthwise along at least a portion of the jamb between the head and the sill. The first sash and the second sash are slideably engaged with the two jambs. The at least one screen assembly is mounted in at least one of: the head or the sill. The at least one screen assembly includes a roller assembly substantially hidden from view and a screen material attached to the roller assembly. The screen assembly is configured to wind the screen material around the roller assembly and to permit the screen material to unwind from the roller assembly under tension applied to an end of the screen material. The edges of the screen material extend into the first slots or the second slots of each of the two jambs. The end of the screen material is coupled to the first lower rail of the first sash when the screen assembly is mounted in the sill, and the end of the screen material is coupled to the second upper rail of the second sash when the screen assembly is mounted in the head. The check rail seal projects from the second lower rail toward the lower sash or projects from the first upper rail toward the upper sash. The check rail seal extends a width of the first sash.

According to another example, ("Example 28") further to Example 27, the check rail seal includes two stile notches, the two stile notches disposed at opposite ends of the check rail seal.

According to another example, ("Example 29") further to Example 28, the check rail seal further includes at least one muntin notch disposed between the two stile notches and spaced apart from the two stile notches.

According to another example, ("Example 30") further to any of Examples 27-29, the check rail seal is configured to contact the lower window pane when the check rail projects from the second lower rail toward the lower sash or to contact the upper window pane when the check rail projects from the first upper rail toward the upper sash.

According to another example, ("Example 31") further to any of Examples 27-30, the check rail seal includes a seal receptor and a seal strip. The seal receptor is connected the second lower rail or the first upper rail. The seal strip includes a plurality of monofilament fibers projecting from the seal receptor.

According to another example, ("Example 32") further to Examples 27-31, the fenestration assembly further includes two check rail end seals projecting from opposite ends of the second lower rail or the first upper rail toward the jambs, each of the check rail end seals sealing against a surface of the jamb.

According to another example, ("Example 33") further to Example 32, each of the two jambs further includes a balance shoe disposed within the lower sash or the upper sash to slideably engage the jamb, the balance shoe including a balance shoe extension to align a surface of the balance shoe with the surface of the jamb against which the check end rail seal can seal.

According to another example, ("Example 34"), a method for operating a fenestration assembly including an upper sash, a lower sash, two jambs, and a screen assembly including screen material attached to a roller assembly, edges of the screen material disposed within slots of the two jambs includes opening at least one of the upper sash or the lower sash, the at least one of the upper sash or the lower sash coupled to an end of the screen assembly to extend the screen material from the roller assembly; closing the at least one of the upper sash or the lower sash to retract the screen material around the roller assembly; and sealing between the upper sash and the lower sash while opening and closing the at least one of the upper sash or the lower sash.

According to another example, ("Example 35") further to Example 34, sealing between the upper sash and the lower sash includes sealing between a rail of one of the upper sash or the lower sash, and rails, stiles, and a window pane of the other one of the upper sash or the lower sash.

According to another example, ("Example 36") further to Example 35, sealing between the upper sash and the lower sash includes sealing between a rail of one of the upper sash or the lower sash, and the two jambs.

According to another example, ("Example 37"), a fenestration assembly includes a sash, a frame surrounding the sash, and a least one screen assembly. The frame includes a head, a sill, and two jambs connecting the head to the sill. The sash is slideably engaged with the two jambs. Each of the two jambs forms a first slot extending lengthwise along at least a portion of the jamb between the head and the sill. The first slot includes a screen edge retention feature extending along a portion of the first slot, and a bump projecting into the first slot adjacent to an end of the screen edge retention feature. The at least one screen assembly is mounted in at least one of: the head and the sill. The at least one screen assembly includes a roller assembly substantially hidden from view, a screen material attached to the roller assembly, and a plurality of raised features. An end of the screen material is coupled to the sash. The screen assembly configured to wind the screen material around the roller assembly and to permit the screen material to unwind from the roller assembly. Edges of the screen material extend into the first slots of each of the two jambs. At least one of the plurality of raised features is attached to each of the edges of the screen material and extends along a portion of the edges of the screen material. The raised features are configured to engage the screen edge retention features and retain each of the edges of the screen material at least partially within the first slots of each of the two jambs.

According to another example, ("Example 38") further to Example 37, the screen edge retention features do not extend along a portion of the first slots adjacent to the sill when the screen assembly is mounted in the sill or along a portion of the first slots adjacent to the head when the screen assembly is mounted in the head, and the bumps are disposed adjacent to an end of the screen edge retention feature nearest to the sill when the screen assembly is mounted in the sill or disposed adjacent to an end of the screen edge retention feature nearest the head when the screen assembly is mounted in the head, the bump configured to protect the screen material from abrasion against the end of the screen edge retention feature.

According to another example, ("Example 39") further to Example 37, each of the two jambs further includes a slot seal disposed within, and extending along, each of the first slots opposite the screen edge retention feature, the slot seal including a resilient portion projecting toward the screen edge retention feature, the resilient portion not extending beyond an end of the screen edge retention feature nearest the sill.

According to another example, ("Example 40"), a method for operating a screen assembly disposed within a fenestration assembly, the screen assembly including screen material attached to a roller assembly, edges of the screen material disposed within slots of the fenestration assembly, the edges including a raised feature and the slots each including a screen edge retaining feature and a bump extending into the slot at an end of the screen edge retaining feature includes opening a sash within the fenestration assembly, the sash coupled to an end of the screen assembly to extend the screen material from the roller assembly, the raised features engaging the screen edge retaining features to retain the screen edges within the slots, and the bumps protecting the screen material from abrasion against the ends of the screen edge retention features; and closing the sash within the fenestration to retract the screen material around the roller assembly.

According to another example, ("Example 41"), a fenestration assembly includes a sash, a frame surrounding the sash, and at least one screen assembly. The sash includes at least one magnet. The frame includes a top portion, a bottom portion, and two jambs connecting the top portion to the bottom portion. Each of the two jambs forms first slots extending lengthwise along at least a portion of the jamb between the top portion and the bottom portion. The sash is slideably engaged with the two jambs between an open configuration in which the sash is not in contact with either of the top portion or the bottom portion, and a closed configuration in which the sash is in contact with one of: the top portion and the bottom portion. The at least one screen assembly is mounted in at least one of: the top portion or the bottom portion. The at least one screen assembly includes a roller assembly, a control bar, and screen material. The roller assembly is substantially hidden from view. The control bar extending beyond the sash and into the first slots. The control bar includes a ferromagnetic material. The screen material is attached to the roller assembly. An end of the screen material is connected to control bar. The screen assembly is configured to apply tension to the screen material to wind the screen material around the roller assembly and to permit the screen material to unwind from the roller assembly under a tension applied to move the control bar away from the roller assembly. The control bar automatically engages the at least one magnet of the sash when the sash is in the closed configuration to attach the control bar to the sash.

According to another example, ("Example 42") further to Example 41, the at least one magnet is continuously moveable between a first position wherein the at least one magnet does not project beyond a surface of the sash and a second position wherein a portion of the at least one magnet projects beyond the surface of the sash.

According to another example, ("Example 43") further to either of Examples 41 or 42, each of the first slots includes a stop, the stops configured to prevent movement of the control bar beyond the stops and automatically disengage the control bar from the at least one magnet if the sash moves beyond the stops.

According to another example, ("Example 44") further to any of examples Example 41-43, the at least one sash is configured to tilt out of a plane formed by the frame, automatically disengaging the control bar from the at least one magnet of the sash.

According to another example, ("Example 45") further to any of Examples 41-44, the sash further includes at least one ejector facing the control bar, the at least one ejector moveable between a first position wherein the at least one ejector is at or below a surface of the sash and a second position wherein a portion of the at least one ejector projects beyond the surface of the sash to disengage the control bar from the at least one magnet.

According to another example, ("Example 46") further to Example 45, the sash further includes a ribbon connected to the at least one ejector and configured such that pulling on the ribbon moves the at least one ejector to the second position.

According to another example, ("Example 47") further to any of Examples 41-46, the at least one magnet is a cylindrical magnet having a longitudinal axis, the cylindrical magnet polarized across its diameter such that rotating the cylindrical magnet about its longitudinal axis varies a magnetic force in the direction of the control bar between a first level of the magnetic force sufficient to engage the control bar and a second level of the magnetic force insufficient to engage the control bar.

According to another example, ("Example 48") further to any of Examples 41-47, the sash is a first sash and the fenestration assembly further includes a second sash. The at least one screen assembly is a first screen assembly and a second screen assembly. The first screen assembly is mounted in the bottom portion and the second screen assembly is mounted in the top portion.

According to another example, ("Example 49") further to Example 48, the fenestration assembly is a double-hung window.

According to another example, ("Example 50"), a fenestration assembly includes at least one sash, a frame surrounding the at least one sash, and at least one screen assembly. The at least one sash includes an upper rail, a lower rail, two stiles connecting the upper rail to the lower rail, and at least one magnet. The at least one magnet is continuously moveable between a first position in which the at least one magnet does not project beyond a surface of the sash and a second position in which a portion of the at least one magnet projects beyond the surface of the sash. The frame includes a top portion, a bottom portion, and two jambs connecting the top portion to the bottom portion. The sash is slideably engaged with the two jambs between an open configuration wherein the sash is not in contact with either of the top portion or the bottom portion and a closed configuration wherein the sash is in contact with one of: the top portion and the bottom portion. The at least one screen assembly is mounted in at least one of: the top portion or the bottom portion. The at least one screen assembly includes a roller assembly, a control bar, and a screen material attached to the roller assembly. The roller assembly is substantially hidden from view. The control bar includes a ferromagnetic material. An end of the screen material is connected to control bar. The screen assembly is configured to wind the screen material around the roller assembly and to permit the screen material to unwind from the roller assembly under tension applied to move the control bar away from the roller assembly. The control bar automatically attaches to at least one magnet of the sash when the sash is in the closed configuration. The at least one magnet is disposed in the lower rail of the sash when the screen assembly is mounted in the bottom portion, and the at least one magnet is disposed the upper rail of the sash when the screen assembly is mounted in the top portion.

According to another example, ("Example 51") further to Example 50, each of the two jambs form first slots extending lengthwise along at least a portion of the jamb between the top portion and the bottom portion, and the control bar extends beyond the sash and into the first slots.

According to another example, ("Example 52") further to Example 51, each of the first slots includes a stop, the stops configured to prevent movement of the control bar beyond the stops and automatically disengage the control bar from the at least one magnet if the sash moves beyond the stops.

According to another example, ("Example 53") further to any of Examples 50-52, the at least one sash is configured to tilt out of a plane formed by the frame, automatically disengaging the control bar from the at least one magnet of the sash.

According to another example, ("Example 54") further to any of Examples 50-53, the sash further includes at least one ejector facing the control bar, the at least one ejector moveable between a first position wherein the at least one ejector is at or below the surface of the sash and a second position wherein a portion of the at least one ejector projects beyond the surface of the sash to disengage the control bar from the at least one magnet.

According to another example, ("Example 55") further to Example 54, sash further includes a ribbon connected to the at least one ejector and configured such that pulling on the ribbon moves the at least one ejector to the second position.

According to another example, ("Example 56") further to any of Examples 50-55, the at least one magnet is a cylindrical magnet having a longitudinal axis, the cylindrical magnet polarized across its diameter such that rotating the cylindrical magnet about its longitudinal axis varies a magnetic force in the direction of the control bar between a first level of the magnetic force sufficient to engage the control bar and a second level of the magnetic force insufficient to engage the control bar.

According to another example, ("Example 57") further to any of Examples 50-56, the at least one sash is a first sash and a second sash. The at least one screen assembly is a first screen assembly and a second screen assembly. The first screen assembly is mounted in the bottom portion and the second screen assembly is mounted in the top portion.

According to another example, ("Example 58"), a screen assembly for a fenestration assembly, the fenestration assembly including frame and a sash slideably engaged with the frame. The screen assembly includes a roller assembly, a control bar, and a screen material. The control bar is configured to extend beyond the sash. The control bar includes a ferromagnetic material. The screen material is attached to the roller assembly. An end of the screen material is connected to the control bar. The screen assembly is configured to wind the screen material around the roller assembly and to permit the screen material to unwind from the roller assembly under tension applied to move the control bar away from the roller assembly. The screen assembly is configured so that the control bar automatically attaches to a magnet of the sash when the sash is closed.

According to another example, ("Example 59") further to Example 58, the ferromagnetic material includes a martensitic or ferritic stainless steel.

According to another example, ("Example 60") further to Example 59, the ferromagnetic material includes type 416 stainless steel.

According to another example, ("Example 61"), a screen assembly for a fenestration assembly, the fenestration assembly including a frame and a sash operatively coupled with the frame, the screen assembly includes a roller assembly and a screen material. The roller assembly is coupled to the frame such that the roller assembly is substantially hidden from view. The roller assembly includes a tubular member formed of a rigid tube having an inner surface, a damper assembly rotationally fixed to the frame, the damper assembly including a damper positioned within the tubular member, and a fluid in a space between the damper and the inner surface of the tubular member. The screen material is attached to the tubular member such that the roller assembly is operable to tension the screen material to wind the screen material around the tubular member. The damper assembly controlling a rate at which the screen material winds around the tubular member.

According to another example, ("Example 62") further to Example 61, the damper includes a central support and at least one blade extending from the central support.

According to another example, ("Example 63") further to Examples 61 or 62, edges of the screen material are configured to extend into slots extending along the frame.

According to another example, ("Example 64") further to any of Examples 61-63, the roller assembly further includes a rod extending through the tubular member and rotationally fixed to the frame, a coupler attached to an end of the rod within the tubular member, the coupler coupling the damper to the rod, and a bearing attached to the tubular member, the rod extending through the bearing, the tubular member and bearing rotatable about the rod.

According to another example, ("Example 65") further to Example 64, the damper assembly further includes a fork, the fork configured to engage the coupler to couple the damper to the rod.

According to another example, ("Example 66") further to Examples 64 or 65, the roller assembly further includes a spring extending along the rod and connecting the coupler to the bearing to provide a rotational bias to the roller assembly to tension the screen material.

According to another example, ("Example 67") further to any of Examples 64-66, the damper assembly further includes at least one radial seal disposed between the fork and the damper and configured to seal against the inner surface of the tubular member.

According to another example, ("Example 68") further to Example 67, the roller assembly further includes a plug disposed adjacent to an end of the damper assembly opposite the coupler, the plug including a plug body and at least one radial seal disposed along the plug body and sealing between the plug bod and the inner surface of the tubular member, the fluid substantially filling a space defined by the at least one radial seal disposed between the fork and the damper, the at least one radial seal disposed along the plug body, and the inner surface of the tubular member.

According to another example, ("Example 69") further to any of Examples 61-68, the fluid has a kinematic viscosity ranging from 5,000 cSt to 500,000 cSt.

According to another example, ("Example 70") a method for operating a screen assembly coupled to a fenestration assembly, the screen assembly including screen material wound around a rigid, tubular member, the method includes opening a sash within the fenestration assembly, the sash coupled to an end of the screen material to unwind the screen material from the tubular member and wind up a spring within the tubular member to provide a rotational bias to the tubular member; and uncoupling the end of the screen material from the sash, the rotational bias of the spring winding the screen material around the tubular member, a damper within the tubular member creating shear forces in a fluid between an inner surface of the tubular member and the damper to control a rate at which the screen material winds around the tubular member.

According to another example, ("Example 71") further to Example 70, the shear forces are directly related to a rotational speed of the tubular member.

The foregoing Examples are just that, and should not be read to limit or otherwise narrow the scope of any of the inventive concepts otherwise provided by the instant disclosure. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

Figure 1:
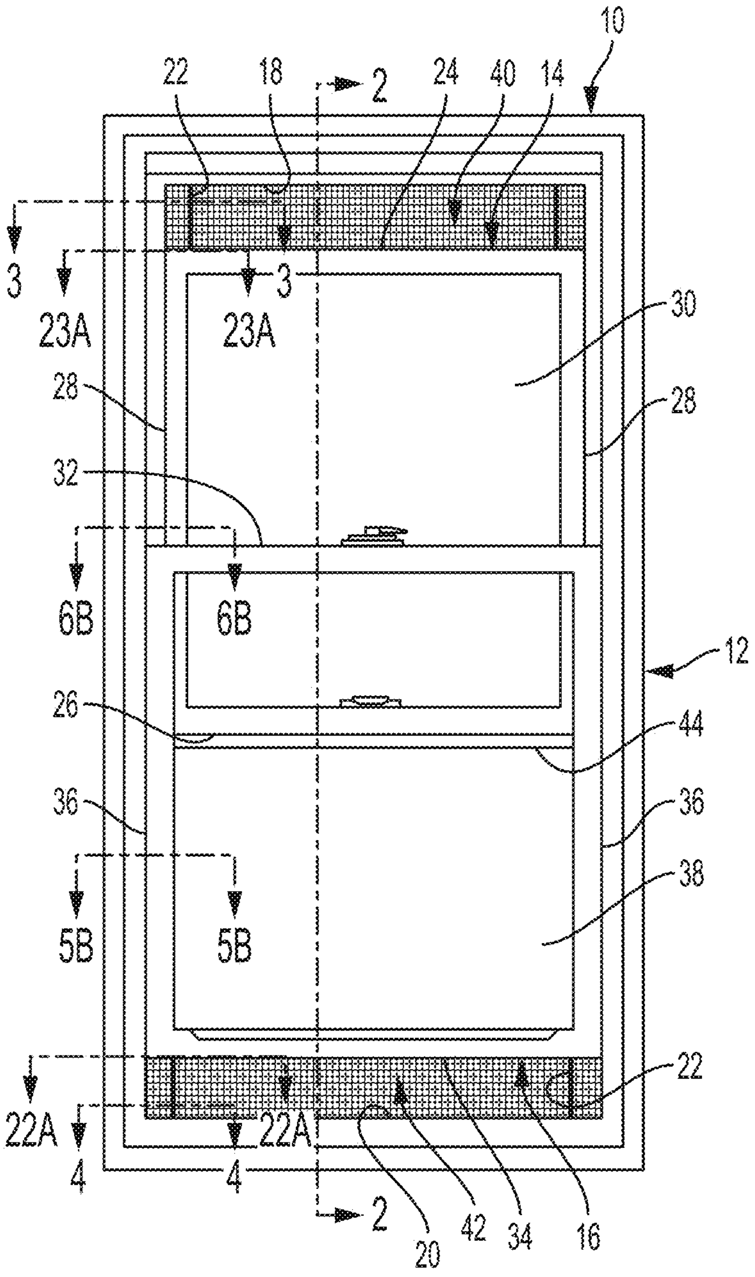
FIG. 1 is an interior view of a fenestration assembly, according to some embodiments of this disclosure.

Persons skilled in the art will readily appreciate that various aspects of the present disclosure can be realized by any number of methods and apparatus configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

DETAILED DESCRIPTION

Some inventive concepts provided by this disclosure relate to edge retention features, enhanced roller assembling dampening designs, improved screen-to-sash coupling mechanisms, more reliable screen winding features, and/or enhanced bug sealing between sashes, for example. These inventive concepts are examples only, and further inventive concepts, as well as their advantages and associated functions will be appreciated from this disclosure.

This disclosure is not meant to be read in a restrictive manner. For example, the terminology used in the application should be read broadly in the context of the meaning those in the field would attribute such terminology.

With respect terminology of inexactitude, the terms “about” and “approximately” may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error or minor adjustments made to optimize performance, for example. In the event it is determined that individuals having ordinary skill in the relevant arts would not readily ascertain values for such reasonably small differences, the terms “about” and “approximately” can be understood to mean plus or minus 10% of the stated value.

Certain terminology is used herein for convenience only. For example, words such as “top”, “bottom”, “upper,” “lower,” “left,” “right,” “horizontal,” “vertical,” “upward,” and “downward” merely describe the configuration shown in the figures or the orientation of a part in the installed position. Indeed, the referenced components may be oriented in any direction. Similarly, throughout this disclosure, where a process or method is shown or described, the method may be performed in any order or simultaneously, unless it is clear from the context that the method depends on certain actions being performed first.

As used herein, the phrase “within any range defined between any two of the foregoing values” literally means that any range may be selected from any two of the values listed prior to such phrase regardless of whether the values are in the lower part of the listing or in the higher part of the listing. For example, a pair of values may be selected from two lower values, two higher values, or a lower value and a higher value.

FIG. 1 is an interior view of a fenestration assembly 10, according to some embodiments of this disclosure. As shown, the fenestration assembly 10 is a double-hung window that includes a frame 12, an upper sash 14, and a lower sash 16. The frame 12 can include a top portion, or head 18, a bottom portion, or sill 20, and jambs 22. Together, the head 18, the sill 20, and the jambs 22 surround and support the upper sash 14 and the lower sash 16. The upper sash 14 can include an upper rail 24, a lower rail 26, stiles 28, and window pane 30. Together, the upper rail 24, the lower rail 26, and the stiles 28 surround and support the window pane 30. The lower sash 16 can include an upper rail 32, a lower rail 34, stiles 36, and window pane 38. Together, the upper rail 32, the lower rail 34, and the stiles 36 surround and support the window pane 38.

As shown in FIG. 1, fenestration assembly 10 includes an upper screen assembly 40, a lower screen assembly 42, and a check rail seal 44. The upper screen assembly 40 can extend between the head 18 and the upper rail 24 of the upper sash 14. The lower screen assembly 42 can extend between the sill 20 and the lower rail 34 of the lower sash 16. In FIG. 1, the upper sash 14 and the lower sash 16 are both shown in open configurations. That is, the upper sash 14 is not in contact with the head 18 and the lower sash 16 is not in contact with the sill 20.

Figure 2:
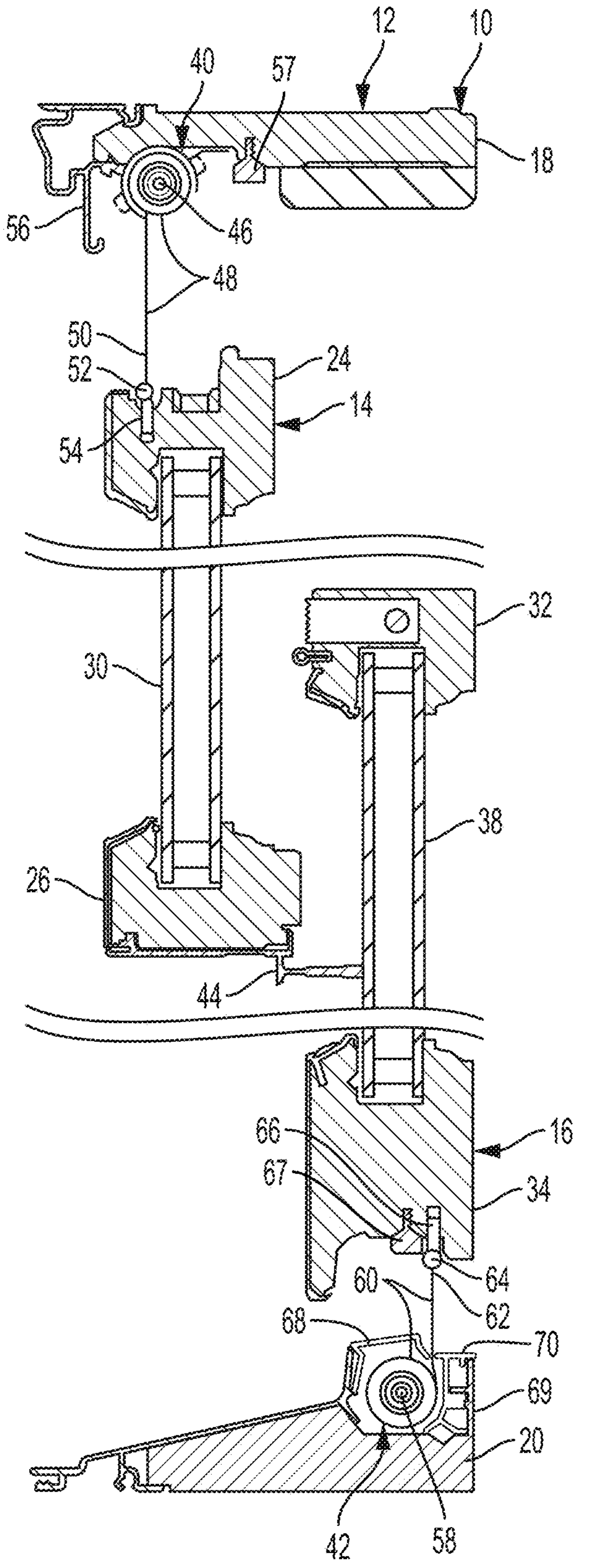
FIG. 2 is a cross-sectional view of the fenestration assembly of FIG. 1 showing upper and lower screen assemblies, according to some embodiments of this disclosure.

FIG. 2 is a cross-sectional view of the fenestration assembly 10 of FIG. 1 showing the upper screen assembly 40, the lower screen assembly 42, and the check rail seal 44, according to some embodiments of this disclosure. As shown in FIG. 2, the upper screen assembly 40 can include a roller assembly 46, a screen material 48 having an end 50, and a control bar 52. In some embodiments, the screen material 48 can be a fiberglass mesh coated with polyvinyl chloride. In some embodiments, the control bar 52 can be a ferromagnetic material which can be attached to the upper rail 24 by an attraction of a magnet 54 attached to the upper rail 24. The control bar 52 can be attached to the end 50 of the screen material 48, thus connecting the end 50 of the screen material 48 to the upper sash 14. Another end (not shown) of the screen material 48 opposite end 50 can be attached to the roller assembly 46. The roller assembly 46 can be rotationally biased to cause the screen material 48 to coil, wind or roll up, around the roller assembly 46 until tension provided by the connection of the end 50 to the upper sash 14 prevents further winding about the roller assembly 46. The tension can draw the screen material 48 taut as it extends between the roller assembly 46 and the upper rail 24 of the upper sash 14, as shown in FIG. 2.

The control bar 52 can include any material that is ferromagnetic at room temperature. In some embodiments, the control bar 52 can include iron, nickel, cobalt, or ferromagnetic alloys including any of iron, nickel, and/or cobalt. In some embodiments, the control bar 52 can include a martensitic or ferritic stainless steel. In some embodiments, the control bar 52 can include type 416 stainless steel. In some embodiments, the control bar 52 can consist of type 416 stainless steel, or be entirely formed of type 416 stainless steel.

In use, as additional tension is applied to the end 50 of the screen material 48 by moving the upper sash 14 away from the roller assembly 46, the screen material 48 unwinds from the roller assembly 46 against the rotational bias. Conversely, as the tension applied to the end 50 of the screen material 48 is reduced by moving the upper sash 14 toward the roller assembly 46, the rotational bias of the roller assembly 46 winds the screen material 48 around the roller assembly 46. The upper sash 14 can be moved vertically within the frame 12 to open or close an area of the fenestration assembly 10 and extend or retract the screen material 48. The upper sash 14 can be moved fully upward to be in contact with the head 18 in a closed configuration, closing the area of fenestration assembly 10 between the upper sash 14 and the head 18 and retracting the screen material 48 into the roller assembly 46. In the closed configuration, the screen material 48 does not obscure the view through the window pane 30. Also, the retracted screen material 48 is protected from the elements when not in use, reducing the opportunity for the accumulation of detritus on the screen material 48. In the open configuration, the screen material 48 does not cover the upper sash 14, unlike a conventional full screen, which provides for an improved aesthetic appearance of the fenestration assembly 10.

As shown in FIG. 2, in some embodiments, the head 18 can include a head cover 56 and head seal 57. The head cover 56 hides the upper screen assembly 40, including the roller assembly 46 and any of the screen material 48 wound about the roller assembly 46, from view for a more aesthetically pleasing appearance. So configured, the roller assembly 46 and any of the screen material 48 wound about the roller assembly 46 are substantially hidden from view. That is, the roller assembly 46 and any of the screen material 48 wound about the roller assembly 46 are not observable by passersby. The head seal 57 can seal against the upper rail 24 when the upper sash 14 is moved fully upward to be in contact with the head 18.

As also shown in FIG. 2, the lower screen assembly 42 can include a roller assembly 58, a screen material 60 having an end 62, and a control bar 64. The screen material 60 and the control bar 64 can include substantially similar features to those described above for the screen material 48 and the control bar 52. As with the control bar 52, the control bar 64 can be attached to the lower rail 34 by an attraction of a magnet 66 attached to the lower rail 34. The control bar 64 can be attached to the end 62 of the screen material 60, thus connecting the end 62 to the lower sash 16. Another end (not shown) of the screen material 60 opposite end 62 can be attached to the roller assembly 58. The roller assembly 58 can be rotationally biased to cause the screen material 60 to coil, wind or roll up, around the roller assembly 58 until tension provided by the connection of the end 62 to the lower sash 16 prevents further winding about the roller assembly 58. The tension can draw the screen material 60 taut as it extends between the roller assembly 58 and the lower rail 34 of the lower sash 16, as shown in FIG. 2.

In use, as additional tension is applied to the end 62 of the screen material 60 by moving the lower sash 16 away from the roller assembly 58, the screen material 60 unwinds from the roller assembly 58 against the rotational bias. Conversely, as the tension applied to the end 62 of the screen material 60 is reduced by moving the lower sash 16 toward the roller assembly 58, the rotational bias of the roller assembly 58 winds the screen material 60 around the roller assembly 58. The lower sash 16 can be moved vertically within the frame 12 to open or close another area of the fenestration assembly 10 and extend or retract the screen material 60. The lower sash 16 can be moved fully downward to be in contact with the sill 20 in a closed configuration, closing the area of fenestration assembly 10 between the lower sash 16 and the sill 20 and retracting the screen material 60 into the roller assembly 58. In the closed configuration, the screen material 60 does not obscure the view through the window pane 38. Also, the retracted screen material 60 is protected from the elements when not in use, reducing the opportunity for the accumulation of detritus on the screen material 60. In the open configuration, the screen material 60 does not cover the lower sash 16, unlike a conventional full screen, which provides for an improved aesthetic appearance of the fenestration assembly 10. As shown in FIG. 2, the lower rail 34 can further include a sill seal 67. The sill seal 67 can seal against the sill 20 when the lower sash 16 is moved fully downward to be in contact with the sill 20.

As shown in FIG. 2, the sill 20 can include a upper sill cover 68, a lower sill cover 69, and a sill cover receptor 70. The upper sill cover 68 and the lower sill cover 69 hide the lower screen assembly 42, including the roller assembly 58 and any of the screen material 60 wound about the roller assembly 58, from view for a more aesthetically pleasing appearance. So configured, the roller assembly 58 and any of the screen material 60 wound about the roller assembly 58 are substantially hidden from view. That is, the roller assembly 58 and any of the screen material 60 wound about the roller assembly 58 are not observable by passersby. The sill cover receptor 70 provides a structural attachment for the lower sill cover 69. The upper sill cover 68, the lower sill cover 69, and the sill cover receptor 70 are more clearly shown in FIGS. 25A and 25B.

In some embodiments, the lower screen assembly 42 can be removed from the fenestration assembly 10 by raising the lower sash 16, detaching the control bar 64 from the magnet 66 to permit the screen material 60 to retract into the lower screen assembly 42, removing the lower sill cover 69 from the sill cover receptor 70, and removing the sill cover receptor 70 from the sill 20. Then the lower screen assembly 42 can be removed from the sill 20 and a repaired or replacement lower screen assembly 42 installed by reversing the process. A similar process may be applied to replace the upper screen assembly 40, without the need to remove or replace the head cover 56.

In some embodiments, the check rail seal 44 can extend from the lower rail 26 of the upper sash 14 to the lower sash 16, as shown in FIG. 2. In other embodiments, the check rail seal 44 can extend from the upper rail 32 to the upper sash 14. The check rail seal 44 is described in further detail below with reference to FIGS. 16-17. Together, the upper screen assembly 40, the upper sash 14, the check rail seal 44, the lower sash 16, and the lower screen assembly 42 can provide a substantially continuous vertical barrier to insects and other pests as the upper sash 14 and the lower sash 16 slideably engage with the frame 12.

Although the fenestration assembly 10 is shown and described with two screen assemblies, upper screen assembly 40 and lower screen assembly 42, various embodiments include fenestration assemblies having only one screen assembly, or more than two screen assemblies.

Figure 3:
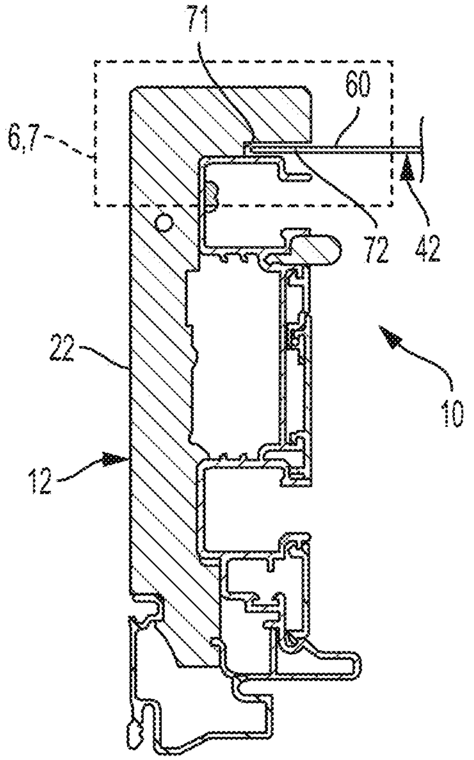
FIG. 3 is a cross-sectional view of a jamb of the fenestration assembly of FIG. 1, where a lower sash can slideably engage the jamb, according to some embodiments of the disclosure.

FIG. 3 is a cross-sectional view of one of the jambs 22 where the lower sash 16 can slideably engage the jambs 22, according to some embodiments of the disclosure. In FIG. 3, a portion of the screen material 60 has been unwound from the roller assembly 58 of the lower screen assembly 42 by moving the lower sash 16 away from the sill 20, as shown in FIGS. 1 and 2. As shown in FIG. 3, each of the jambs 22 include a first slot 71 formed by the jamb 22. Although only one of the two jambs 22 is shown in FIG. 3 for ease of illustration, it is understood that each of the jambs 22 includes a first slot 71, thus, fenestration assembly 10 includes two first slots 71. The screen material 60 is wider than the lower sash 16 so that edges 72 (one shown in FIG. 3) of the screen material 60 can project into the first slots 71 of each of the two jambs 22 when unwound from the roller assembly 58. Thus, together the screen material 60 and the jambs 22 can provide a substantially continuous horizontal barrier to insects and other pests.

Figure 4:
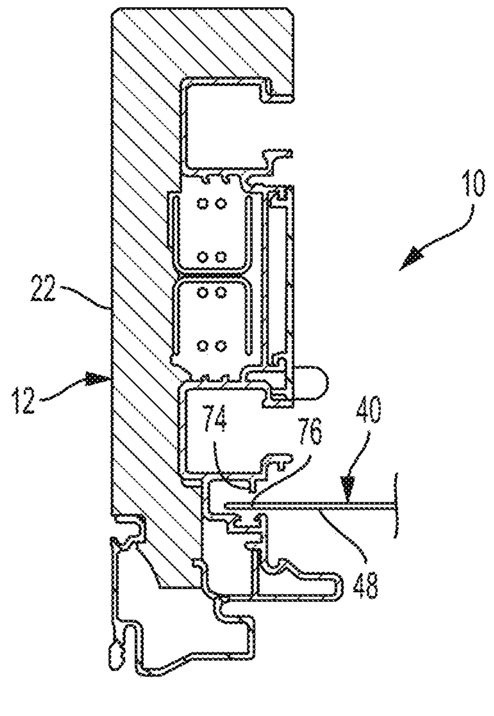
FIG. 4 is a cross-sectional view of a jamb of the fenestration assembly of FIG. 1, where an upper sash can slideably engage the jamb, according to some embodiments of the disclosure.

FIG. 4 is a cross-sectional view of one of the jambs 22 where the upper sash 14 can slideably engage the jambs 22, according to some embodiments of the disclosure. In FIG. 4, a portion of the screen material 48 has been unwound, or unwound from the roller assembly 46 of the upper screen assembly 40 by moving the upper sash 14 away from the head 18, as shown in FIGS. 1 and 2. As shown in FIG. 4, each of the jambs 22 include a second slot 74 formed by the jamb 22. Although only one of the two jambs 22 is shown in FIG. 4 for ease of illustration, it is understood that each of the jambs 22 includes a second slot 74, thus, fenestration assembly 10 includes two second slots 74. The screen material 48 is wider than the upper sash 14 so that edges 76 (one shown in FIG. 4) of the screen material 48 can project into the second slots 74 of each of the two jambs 22 when unwound from the roller assembly 46. Thus, together the screen material 48 and the jambs 22 can provide a substantially continuous horizontal barrier to insects and other pests.

Figure 5A:
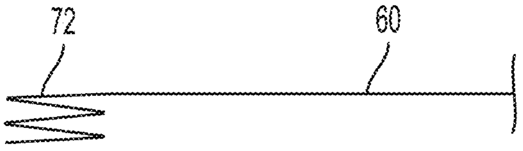
FIGS. 5A and 5B are schematic cross-sectional views of an edge of a screen material of a screen assembly, according to some embodiments of this disclosure.
Figure 5B:
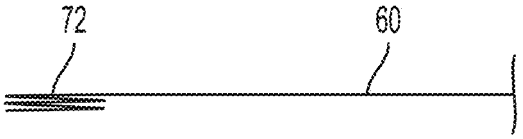

Referring back to FIG. 3, in use, as the screen material 60 repeatedly moves along the first slots 71 over time, the edges 72 may be subjected to frictional forces that can cause fraying and damage to the screen material 60, compromising its effectiveness as a barrier to insects and pests and making the screen material 60 less aesthetically pleasing. In some embodiments, the edges 72 can be formed to strengthen its resistance to fraying and damage. FIGS. 5A and 5B are schematic cross-sectional views of one of the edges 72 of the screen material 60, according to some embodiments of this disclosure. The screen material 60 can be folded, as shown in FIG. 5A, and then the folded screen material 60 can be fused together to form the edge 72. The screen material 60 can include a single fold or a plurality of folds as desired. In some embodiments, the fusing process can include applying heated plates to the folded screen material 60. In some embodiments, the fusing process can include ultrasonically welding, heat welding and/or applying an adhesive to the folded screen material 60.

In the embodiment shown in FIGS. 5A and 5B, there are 5 folds in the material. In some embodiments, the edge 72 can include as few as 1 fold, or 2 folds, or as many as 3 folds, 4 folds, 5 folds or more. The greater the number of folds, the stronger and more damage resistant the edge 72 can become. However, the greater the number of folds, the thicker the edge 72 becomes, increasing the size of the lower screen assembly 42. A larger lower screen assembly 42 is more difficult to hide in the sill 20. In embodiments having only a single fold, the fused edge 72 can have a thickness comparable to the unfolded screen material 60 as fibers of the mesh of one half of the fold move into the gaps between the fibers of the mesh of the other half of the fold during the fusing process. Such a single-fold edge can still have greater resistance to fraying and damage as compared with the screen material 60 without increasing the size of the lower screen assembly 42. Thus, in some embodiments, the single-fold edge has approximately the same thickness as a remainder of the screen material 60.

Although FIGS. 5A and 5B describe the edge 72 of the screen material 60 of the lower screen assembly 42, it is understood that the same description can be applied to the edge 76 of the screen material 48 of the upper screen assembly 40.

Figure 6:
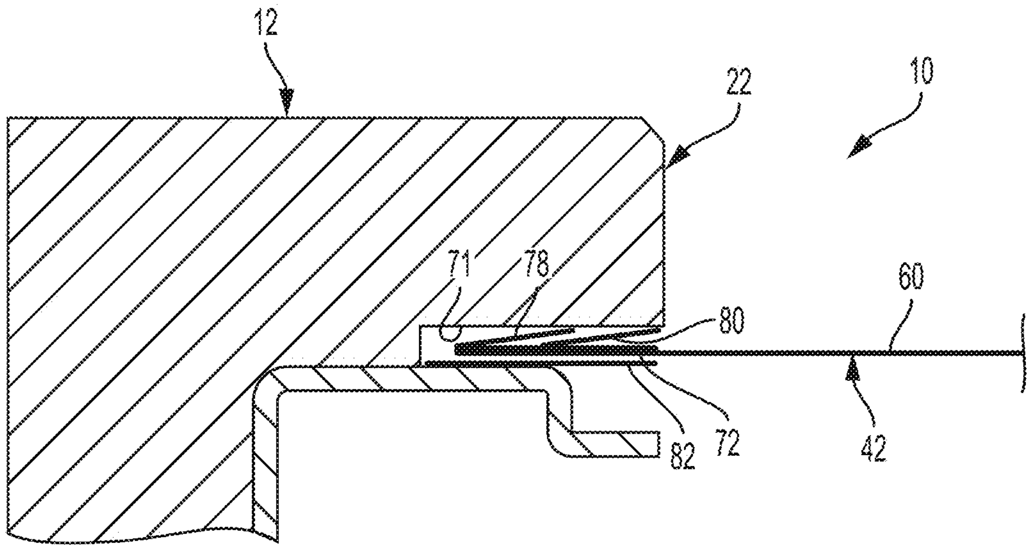
FIG. 6 is an enlarged schematic cross-sectional view of a portion of the jamb shown in FIG. 3, according to some embodiments of the disclosure.

FIG. 6 is a schematic cross-sectional view of a portion of the jamb 22 shown in FIG. 3, according to some embodiments of the disclosure. As shown in FIG. 6, the lower screen assembly 42 can further include a plurality of raised features including a flat hook 78. At least one flat hook 78 can be attached to, and extend along a portion of, each of the edges 72 (one shown in FIG. 6). In some embodiments, the flat hooks 78 can be flexible hooks that can wind up around the roller assembly 58 along with the screen material 60. In some embodiments, the flat hooks 78 can be formed of a thin sheet of a flexible polymer including, for example, polyvinyl chloride, polyester, or polypropylene. The flat hooks 78 can be attached to the edges 72 by, for example, ultrasonic welding, heat welding or an adhesive. The flat hooks 78 can extend along the portion of each of the edges 72 adjacent to the end 62 (FIG. 2) of the screen material 60. In some embodiments, each of the flat hooks 78 can extend along the edge 72 for as little as 0.25 inches (6.3 mm), 0.5 inches (12.7 mm), 0.75 inches (19.1 mm), ora much as 1.25 inches (31.8 mm), 1.5 inches (38.1 mm), or 2 inches (50.1 mm), or for any length between any of the preceding lengths. In some embodiments, the flat hook 78 may extend along the edge 72 for 1 inch (25.4 mm).

As further shown in FIG. 6, each of the first slots 71 can further include a screen edge retention feature 80 attached to the jamb 22 and extending along a portion of each of the first slots 71. The screen edge retention features 80 can be, for example, in the form of a complementary raised structure or flat hook configured to engage the flat hook 78 and retain the edges 72 at least partially within the first slots 71, as shown in FIG. 6. In some embodiments, the screen edge retention features 80 can be formed of a thin sheet including for example, polycarbonate or polyvinyl chloride. Together, the flat hooks 78 and the screen edge retention features 80 can keep the edges 72 of the screen material 60 within the first slots 71 to preserve the substantially continuous horizontal barrier to insects and other pests. In some embodiments, the screen edge retention features 80 do not extend along a portion of the first slots 71 adjacent to the sill 20. This gap in the screen edge retention features 80 frees the flat hooks 78 from the first slots 71 when the screen material 60 is fully wound up, or retracted, by the roller assembly 58, allowing the lower screen assembly 42 to be more easily removed from the sill 20 for repair or replacement.

As further shown in FIG. 6, each of the first slots 71 can further include strips of low friction material 82 attached to the jamb 22 and extending along each of the first slots 71 to reduce the friction damage to the edges 72 and provide for smoother operation of the lower screen assembly 42. In some embodiments, the low friction material 82 can include polyvinyl chloride, polytetrafluoroethylene, or polypropylene, for example, although a variety of materials are contemplated.

Figure 7:
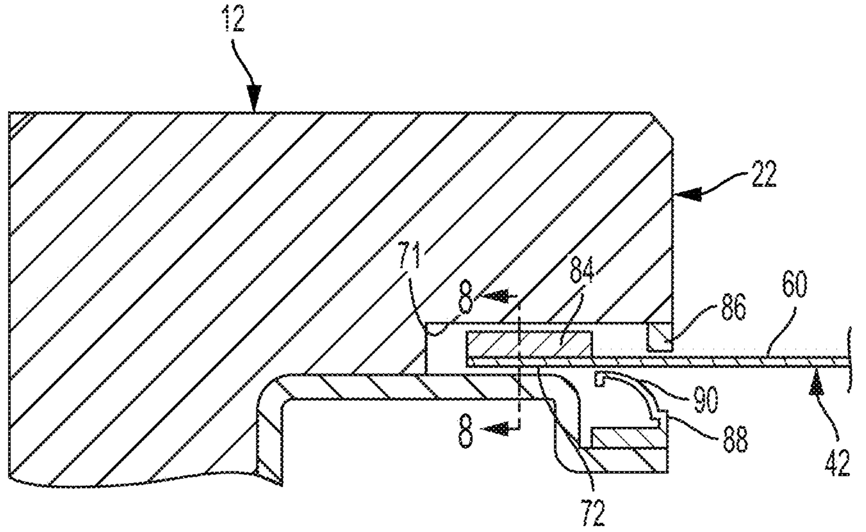
FIG. 7 is an enlarged schematic cross-sectional view of a portion of the jamb shown in FIG. 3, according to some other embodiments of the disclosure.

FIG. 7 is a schematic cross-sectional view of a portion of the jamb 22 shown in FIG. 3, according to some other embodiments of the disclosure. In particular, FIG. 7 shows an alternative arrangement for retaining the edges of the screen material 60 in the jambs 22. As shown in FIG. 7, the lower screen assembly 42 can further include a plurality of raised features including a flexible strip 84. At least one flexible strip 84 can be attached to, and extend along a portion of, each of the edges 72 (one shown in FIG. 7). In some embodiments, the flexible strip 84 can include a flexible polymer, such as polyvinyl chloride, polypropylene, or polyester, for example, attached to the edges 72 by ultrasonic welding, heat welding, and/or an adhesive, for example. In some embodiments, the flexible strip 84 can include a thin sheet of metal attached to the edges 72 by an adhesive or a physical crimping of the metal. In some embodiments, the flexible strips 84 can extend along the portion of each of the edges 72 adjacent to the end 62 (FIG. 2) of the screen material 60. In some embodiments, the flexible strips 84 extend along the edge 72 for as little as 0.5 inches (12.7 mm), 0.75 inches (19.1 mm), 1 inch (25.4 mm), or a much as 1.5 inches (38.1 mm), 2 inches (50.1 mm), 2.5 inches (63.5 mm), or 3 inches (76.2 mm), or for any length between any of the preceding lengths. In some embodiments, the flat hook 78 may extend along the edge 72 for 1.25 inches (31.8 mm), for example, although a variety of dimensions are contemplated.

As shown in FIG. 7, each of the first slots 71 can further include a screen edge retention feature 86 extending along a portion of each of the first slots 71. The screen edge retention features 86 can be, for example, in the form of a complementary raised structure configured to block movement of the flexible strip 84 out of the first slot 71. By engaging the flexible strip 84 in this manner, the screen edge retention feature 86 can retain the edge 72 at least partially within the first slot 71. In some embodiments, the screen edge retention feature 86 can be a rigid structure including a polymer, such as polyvinyl chloride, polyethylene, or polycarbonate, for example. In some embodiments, each of the first slots 71 can further include a low friction material strip 88, such as a weather stripping, that extends along each of the first slots 71 opposite the screen edge retention feature 86. The low friction material strip 88 can include a resilient portion 90 extending toward the screen material 60. The resilient portion 90 can help prevent the flexible strip 84 from moving past the screen edge retention feature 86 by forcing the screen material toward the screen edge retention feature 86. Together, the flexible strips 84, the low friction material strip 88, and the screen edge retention features 86 can keep the edges 72 of the screen material 60 within the first slots 71 to preserve the substantially continuous horizontal barrier to insects and other pests. In some embodiments, the screen edge retention features 86 do not extend along a portion of the first slots 71 adjacent to the sill 20. This gap in the screen edge retention features 86 frees the flexible strips 84 from the first slots 71 when the screen material 60 is fully wound up, or retracted, by the roller assembly 58, allowing the lower screen assembly 42 to be more easily removed from the sill 20 for repair or replacement.

Figure 8:
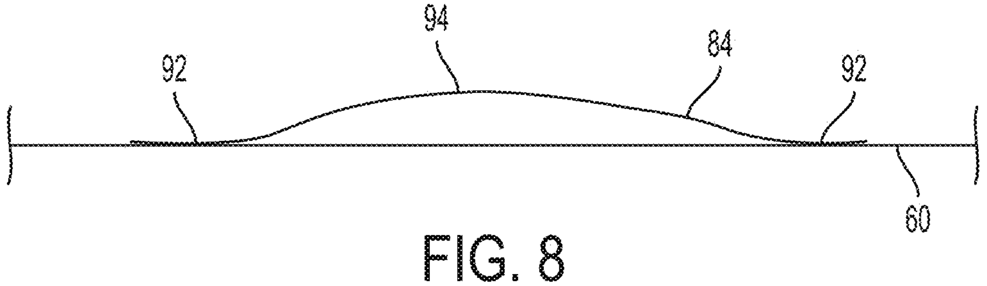
FIG. 8 is a schematic side view of a raised feature attached to screen material, according to some embodiments of this disclosure.

FIG. 8 is a schematic side view of the flexible strip 84 attached to the screen material 60, according to some embodiments of this disclosure. As shown in FIG. 8, the flexible strip 84 can include two ends 92. In the view of FIG. 8, the two ends 92 are oriented opposite one another along the length of the screen material 60 (e.g., along the height of the screen material in the foregoing examples). The flexible strip 84 can be attached to the screen material 60 at the two ends 92 but remain unattached to the screen material 60 between the two ends 92. A length of the flexible strip 84 is greater than a distance between the two ends 92 when attached to the screen material 60 so that a portion of the flexible strip 84 between the ends 92 raises up from the screen material 60 and forms a raised hump 94, also described as a raised portion 94. The raised hump, or raised portion generally projects in either a direction of the interior or exterior of the fenestration unit 10. The raised hump 94 can be most pronounced when the screen material 60 is unwound from the roller assembly 58 and in tension, as shown in FIG. 8. When the screen material 60 including the flexible strip 84 is wound about the roller assembly 58, the raised hump 94 can be less pronounced. In some embodiments when the screen material 60 including the flexible strip 84 is wound about the roller assembly 58, the entire length of the flexible strip 84 can lay against the screen material 60, substantially eliminating the raised hump 94. This feature of collapsing the raised hump 94 is a feature of the screen material 60 being wrapped around a circumference of the tubular member 96. Such embodiments can provide a plurality of raised features attached to the edges 72 without substantially increasing the size of the lower screen assembly 42 (e.g., due to the nature of the raised hump 94, or raised portion 94 collapsing upon winding of the screen material 60).

Figure 9:
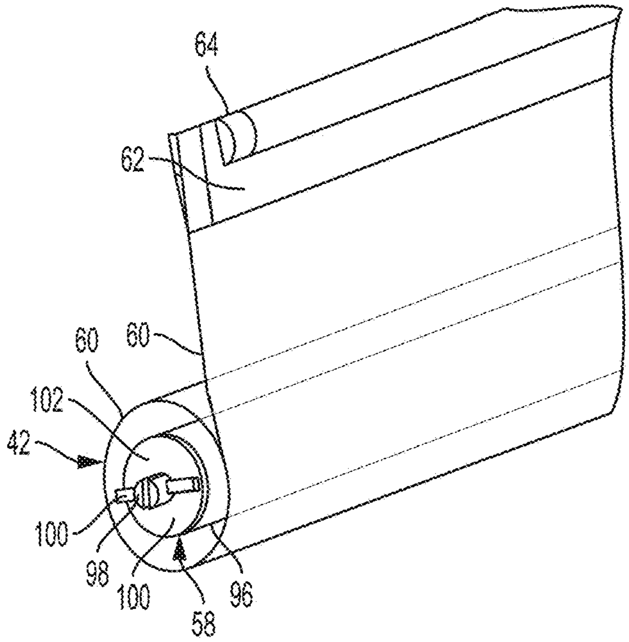
FIG. 9 is a schematic perspective view a screen assembly, according to some embodiments of this disclosure.

FIG. 9 is a schematic perspective view of the lower screen assembly 42, according to some embodiments of this disclosure. FIG. 9 shows the lower screen assembly 42 uninstalled from the sill 20 with a portion of the screen material 60 rolled up around the roller assembly 58, and a portion of the screen material 60 extending from the roller assembly 58. As shown in FIG. 9, the roller assembly 58 can include a tubular member 96, a rod 98, at least one pin 100 (two shown), and a bearing 102. The tubular member 96 can be a hollow, rigid tube as shown further in FIGS. 10 and 11 described below. The tubular member 96 can be formed of metal or a rigid polymer, for example. The rod 98 and the pins 100 can be formed of rigid materials. The pins 100 can extend from an end of the rod 98 at least partially perpendicular to the rod 98. In the embodiment shown in FIG. 9, the pins 100 extend perpendicularly from the end of the rod 98. The bearing 102 can include a polymer, such as polyvinyl chloride, polypropylene, or any of a variety of other materials.

The tubular member 96 can be attached to the bearing 102. The rod 98 can extend through the bearing 102 and into the tubular member 96. The rod 98 is not fixed with respect to the bearing 102, so that the bearing 102 and the tubular member 96 can rotate about the rod 98. When the lower screen assembly 42 is installed in the sill 20, the pins 100 engage corresponding features (not shown) in one of the jambs 22 to prevent rotation of the rod 98, while the bearing 102 permits rotation of the tubular member 96 about the rod 98 to allow the screen material 60 to extend and retract as described above.

Figure 10:
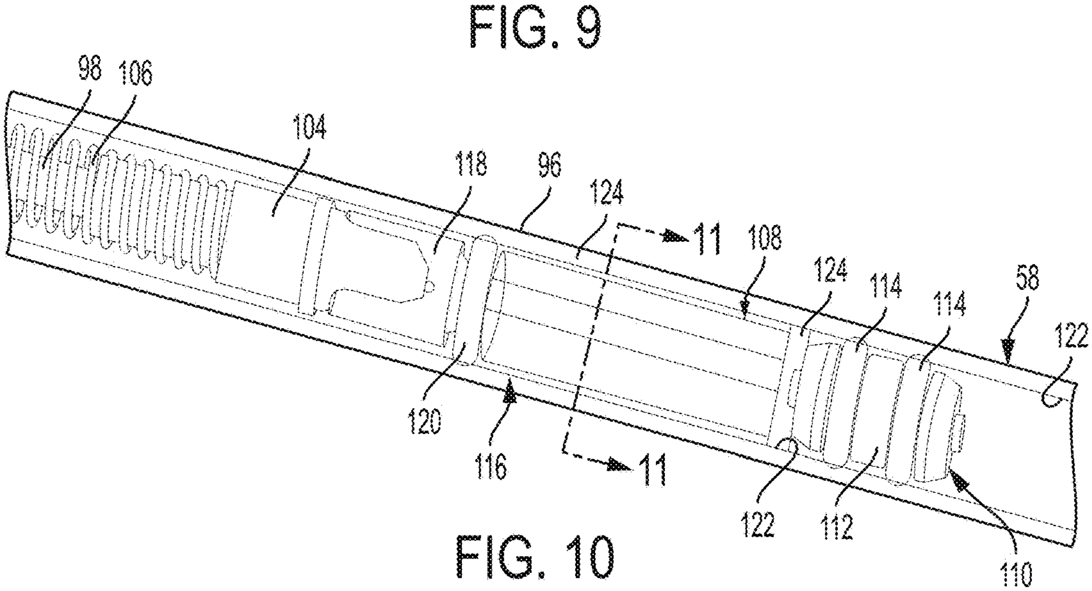
FIG. 10 is a perspective view of an interior of a roller assembly, according to some embodiments of this disclosure.

FIG. 10 is a perspective view of an interior of the roller assembly 58, according to some embodiments of this disclosure. As shown in FIG. 10, the roller assembly 58 can further include a coupler 104, a spring 106, a damper assembly 108, and a plug 110. The plug 110 can include a plug body 112 and at least one radial seal 114 (two shown). The radial seal 114 may be any type of radial seal known in the art, such as an O-ring, for example. The damper assembly 108 can include a damper 116, a fork 118, and at least one radial seal 120 (one shown). In some embodiments, the spring 106 can be a helical spring, as shown in FIG. 10. In some embodiments, the coupler 104, the plug 110, the damper 116, and the fork 118 can be formed of rigid materials. The radial seals 114 and radial seal 120 can be formed of any of a number of elastomeric polymers known in the art.

The spring 106 connects to the coupler 104 and extends along the length of the rod 98 to connect to the bearing 102 (FIG. 9). Thus, the spring 106 acts between the non-rotating rod 98 and the tubular member 96 to provide the rotational bias to the roller assembly 58, as described above. The coupler 104 is attached to an end of the rod 98 within the tubular member 96. The coupler 104 is configured to couple to the fork 118 to attach the damper assembly 108 to the rod 98. The radial seal 120 is disposed between the fork 118 and the damper 116 and seals between the damper assembly 108 and an inner surface 122 of the tubular member 96. The plug 110 is disposed adjacent to an end of the damper assembly 108 opposite the coupler 104. The plug 110 is not rotationally fixed with respect to the damper assembly 108. The radial seals 114 are disposed along the plug body 112 and seal between the plug body 112 and the inner surface 122 of the tubular member 96.

A fluid 124 can substantially fill a space defined by the radial seals 114, the radial seal 120, and the inner surface 122 of the tubular member 96. The fluid 124 can be a fluid having a kinematic viscosity as low as 5,000 centistoke (cSt), 10,000 cSt, 20,000 cSt, 30,000 cSt, 40,000 cSt, or 50,000, or as high as 60,000 cSt, 70,000 cSt, 80,000 cSt, 90,000 cSt, 100,000 cSt, 250,000 cSt, or 500,000 cSt or within any range defined between any two of the foregoing values. For example, in some embodiments, the kinematic viscosity of the fluid 124 can range from 5,000 cSt to 500,000 cSt, 10,000 cSt to 250,000 cSt, 20,000 cSt, to 100,000 cSt, 30,000 cSt to 90,000 cSt, 40,000 cSt to 80,000 cSt, or 50,000 cSt to 70,000 cSt, for example, although a variety of values are contemplated.

Figure 11:
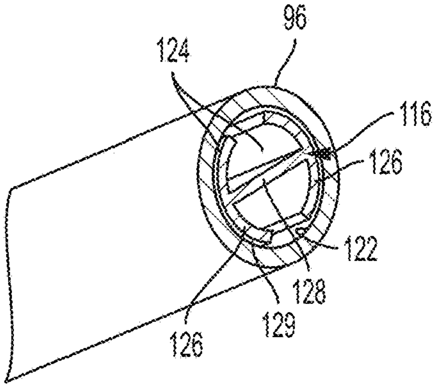
FIG. 11 is a perspective cross-sectional view of the roller assembly of FIG. 10 showing a damper assembly of the roller assembly, according to some embodiments of this disclosure.

In terms of operation, the damper assembly generally operates to reduce the rotational velocity at which the screen material is retracted. FIG. 11 is a perspective cross-sectional view of the roller assembly 58 of FIG. 10, according to some embodiments of this disclosure taken along line 11-11 in FIG. 10. FIG. 11 shows the damper 116 disposed within the tubular member 96. As shown in the embodiment of FIG. 11, the damper 116 can include at least one blade 126 (four shown) extending from a central support 128. The fluid 124 substantially fills the space between the blades 126 and the central support 128, and the inner surface 122 of the tubular member 96, including a gap between outer surfaces 129 of the blades 126 and the inner surface 122.

Considering FIGS. 9-11 together, in use, as a portion of the screen material 60 is unwound from the roller assembly 58 of the lower screen assembly 42 by moving the lower sash 16 away from the sill 20 as described above in reference to FIG. 3, the tubular member 96, which is attached to the screen material 60, rotates about the non-rotating rod 98, winding up the spring 106, increasing its rotational bias. If the control bar 64 is suddenly released from the lower sash 16, the damper assembly 108 can provide a counter-force to the rotational bias of the spring 106 to limit the rotational speed of the tubular member 96. Without the damper assembly 108, the spring 106 could rotate the tubular member 96 so quickly that the lower screen assembly 42, or other parts of the fenestration assembly 10, could be damaged or a user could be harmed, for example.

The counter-force can be directly related to the rotational speed of the tubular member 96, thus limiting the rotational speed of the tubular member 96 without significantly impeding the rotation of the tubular member 96 at lower rotational speeds, such as during normal operation of the lower sash 16. Without wishing to be bound by any theory, it is believed that the rotation between the tubular member 96 and the damper 116 creates shear forces in the fluid 124 between the inner surface 122 of the tubular member 96 and the outer surfaces 129 of the blades 126 that are directly related to the rotational speed of the tubular member 96, thus providing a damping force to resist the built-up rotational bias in the spring 106 at higher rotational speeds.

Tubular member 96 is both the tube around which the screen material 60 winds and the tube providing the inner surface 122 against which the shear forces in the fluid 124 are created to counter the rotational bias of the spring 106. Use of the same tube for both purposes may provide for a more efficient (e.g., relatively more compact) lower screen assembly 42.

Although the damper 116 is shown in FIG. 11 with four blades 126 extending from the central support 128 and forming two arc-shaped structures in cross-section, it is understood that embodiments of the disclosure may more blades or fewer blades, and may include blades forming other shaped structures. Embodiments of the damper 116 may include a single blade forming a single structure in cross-section, such as a circular cross-section forming a cylinder. In some embodiments, the damper 116 may not include a central support 128 as the single structure, such as a cylindrical structure, may provide sufficient support for the damper 116.

Figure 12:
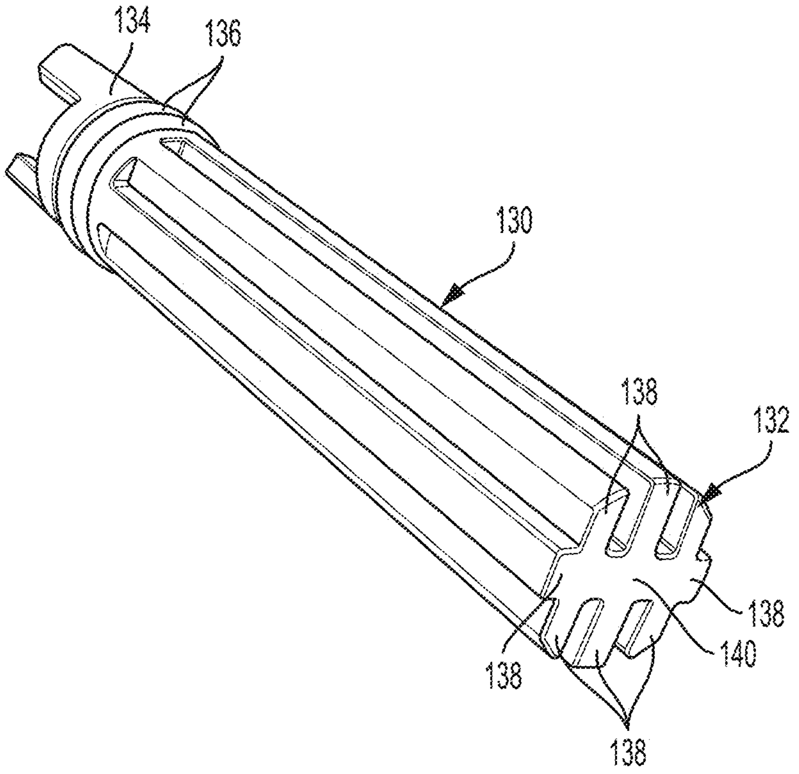
FIG. 12 is a perspective end view of another damper assembly, according to some embodiments of this disclosure.

FIG. 12 is a perspective end view of another damper assembly, according to some embodiments of this disclosure. FIG. 12 shows a damper assembly 130. The damper assembly 130 can be used in place of the damper assembly 108 described above in reference to FIGS. 10 and 11. The damper assembly 130 can include a damper 132, a fork 134, and at least one radial seal 136 (two shown). The damper 132 can include at least one blade 138 (eight shown) extending from a central support 140. In use, the fork 134 can couple to the coupler 104 (FIG. 10) to attach the damper assembly 130 to the rod 98. As with the damper assembly 108, the damper assembly 130 can provide a counter-force to the rotational bias of the spring 106 to limit the rotational speed of the tubular member 96.

In some embodiments, the damper 132 and the fork 134 are formed from as a single monolithic structure. In other embodiments, the damper 132 and the fork 134 are formed separately, and then joined together by, for example, a threaded connector or connection. In some embodiments, the depositing of the at least one radial seal 136 between the fork 134 and the damper 132 can be less damaging to the at least one radial seal 136 when the damper 132 and the fork 134 are formed separately, and the at least one radial seal 136 is attached before the damper 132 and the fork 134 are joined together.

Figure 13:
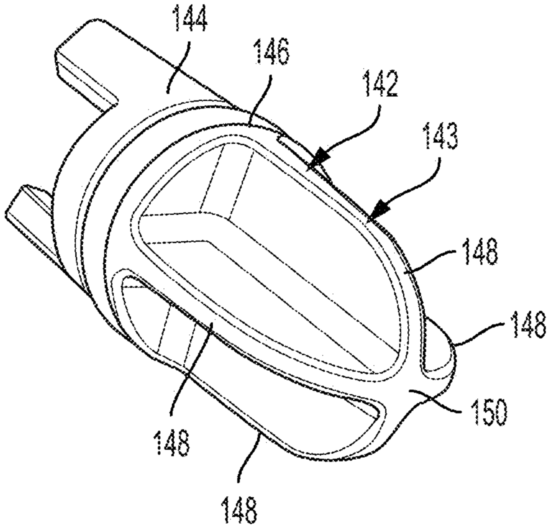
FIG. 13 is a perspective end view of another damper assembly, according to some embodiments of this disclosure.

FIG. 13 is a perspective end view of yet another damper assembly 142, according to some embodiments of this disclosure. The damper assembly 142 can be used in place of the damper assembly 108 described above with reference to FIGS. 10 and 11. The damper assembly 142 can include a damper 143, a fork 144, and at least one radial seal 146 (one shown). The damper 143 can include at least one blade 148 (four shown) extending from a central support 150. In use, the fork 144 can couple to the coupler 104 (FIG. 10) to attach the damper assembly 142 to the rod 98. As with the damper assembly 108, the damper assembly 142 can provide a counter-force to the rotational bias of the spring 106 to limit the rotational speed of the tubular member 96.

In some embodiments, the damper 143 and the fork 144 are formed as a single monolithic structure. In other embodiments, the damper 143 and the fork 144 are formed separately, and then joined together by, for example, a threaded connector or connection. It may be less damaging to the radial seal(s) 146 when the damper 143 and the fork 144 are formed separately, and the at least one radial seal 146 is attached before the damper 143 and the fork 144 are joined together.

Although the embodiments of FIGS. 6-13 are shown and described with respect to the lower screen assembly 42 it is understood that the same description can be applied to the upper screen assembly 40.

As described above in reference to FIGS. 6 and 7, the edges 72 of the screen material 60 can be held within the first slot 71 by the engagement of the plurality of edge retention features, such as flat hooks 78 or flexible strips 84, with the screen retention features, such as screen retention features 80 or 86. However, at a high enough wind speed flowing through the screen material 60, the force against the screen material 60 can be sufficient to disengage the edge retention features from the screen retention features and pull one or both of the edges 72 from the first slots 71. In such a case, the screen material 60 must be rethreaded into the first slot 71 before it is retracted onto the roller assembly 58, or the screen material 60 may fold in upon itself, causing permanent creases on the screen material 60 and/or preventing the roller assembly 58 from retracting the full length of the screen material 60. This problem may be exacerbated by the continued flow of wind through the screen material 60 as the lower sash 16 is closed.

Figure 14:
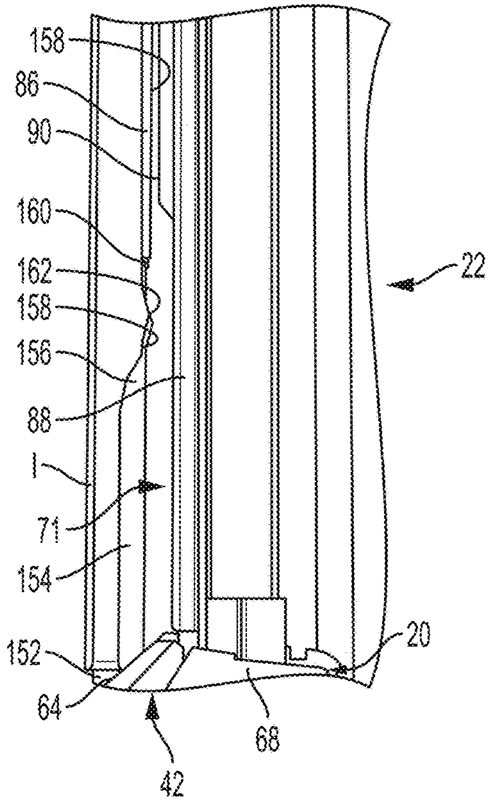
FIG. 14 is a side view of a portion of the fenestration assembly of FIG. 1, showing a screen rethreading system, according to some embodiments of the disclosure.
Figure 15:
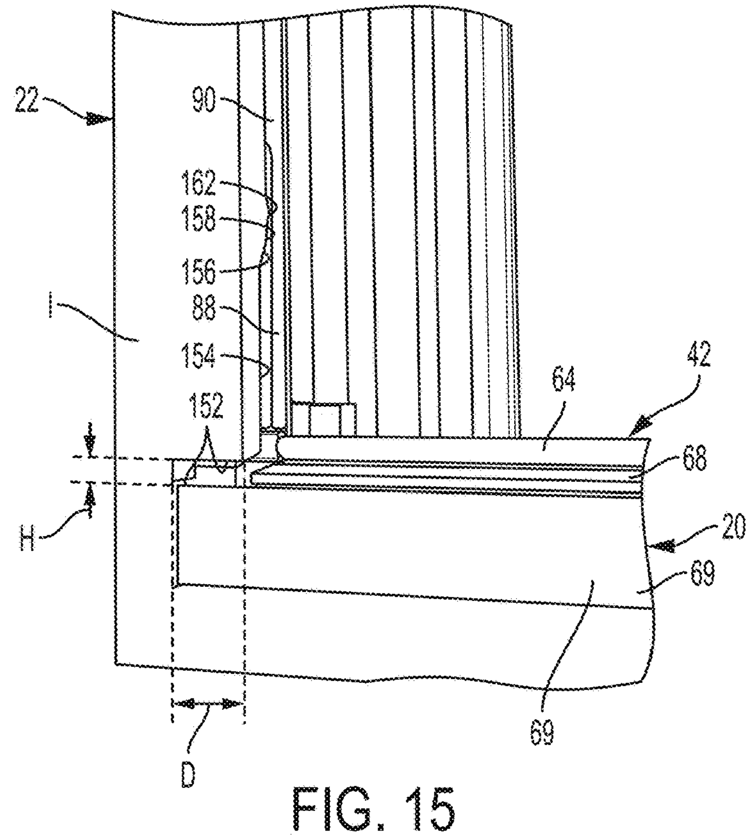
FIG. 15 is perspective view of the portion of the fenestration assembly shown in FIG. 14, according to some embodiments of the disclosure.

FIGS. 14 and 15 are views of a portion of one of the jambs 22 of the fenestration assembly 10 of FIG. 1, including a screen rethreading system, according to some embodiments of the disclosure. FIG. 14 is a side view from inside the frame 12 and FIG. 15 is a perspective view from outside the frame 12. As shown in the embodiment of FIGS. 14 and 15, the jamb 22 can include a rethreading slot 152 and the first slot 71 can include a chamfered portion 154, a transition portion 156, and a remainder portion 158. The rethreading slot 152 can be disposed at an end of the jamb 22 adjacent to the sill 20 at an interior-facing surface I of the jamb 22. The rethreading slot 152 can extend into the jamb 22 to a depth D sufficient for the rethreading slots 152 of the two jambs 22 together to accommodate the full width of the screen material 60, including edges 72. The chamfered portion 154 can be disposed at an end of the first slot 71 adjacent to the sill 20. The chamfered portion 154 can be formed by a side of the first slot 71 nearest the interior-facing surface I of the jamb 22. The transition portion 156 is disposed between the chamfered portion 154 and the remainder portion 158. The remainder portion 158 can be a balance of the first slot 71 that does not include the chamfered portion 154 and the transition portion 156. In some embodiments, transition portion 156 can include a surface curvature that blends the chamfered portion 154 with the remainder portion 158, or otherwise provides a smooth transition from the narrower width of the slot to the expanded width of the chamfered portion 154. For example, in some embodiments, the chamfered portion 154 and the transition portion 156 together can be in the shape of a so called "lark's tongue chamfer", as shown best in FIG. 14.

In use, should a high wind force a portion of the edges 72 and a portion of the screen material 60 out of the first slot 71, the portion of the screen material 60 will rethread through the rethreading slot 152 as the lower sash 16 is lowered and the roller assembly 58 retracts the screen material 60 through the rethreading slot 152. However, the control bar 64 can be wider than the lower sash 16 so that it can project into the first slots 71 of each of the two jambs 22. A portion of the screen material 60 adjacent to the control bar 64 cannot move out of the first slot 71 and rethread through the rethreading slot 152 because it is held in the first slot 71 by the control bar 64. Thus, as the lower sash 16 gets close to the sill 20 (e.g., about 4 inches), a tension may develop between a portion of the screen material 60 outside of the first slot 71 and a portion of the screen material 60 close to the control bar 64, which may cause intervening screen material 60 to wrap around a portion of the jamb 22 above the rethreading slot 152. This tension is reduced by the chamfered portion 154, which eliminates a right-angle corner and widens the first slot 71. The transition portion 156 provides a smooth transition between the chamfered portion 154 and the remainder portion 158, reducing the risk of damage to the screen material 60 from an otherwise sharp edge as it passes from the chamfered portion 154 to the remainder portion 158. Without the chamfered portion 154 and the transition portion 156, the screen material 60 wrapped around the jamb 22 may pinch together as it retracted on the roller assembly 58, causing permanent creases on the screen material 60 and/or preventing the roller assembly 58 from retracting the full length of the screen material 60. With the rethreading slot 152, the chamfered portion 154, and the transition portion 156, the screen material 60 may be automatically rethreaded into the first slot 71 and fully retracted onto the roller assembly 58 without damage to the screen material 60 by lowering the lower sash 16.

If a height H of the rethreading slot 152 is great enough, such as greater than 1.5 inches, for example, then the tension on the intervening screen material 60 may be low enough that the screen material 60 may recover from being pinched together before being retracted by the roller assembly 58, or the intervening screen material 60 may not be pinched together at all, without the chamfered portion 154 or the transition portion 156. However, it is desirable for aesthetic purposes to maintain the height H of the rethreading slot 152 as small as possible.

The height H of the rethreading slot 152 may be as small as 0.1 inches, 0.2 inches, 0.4 inches, or 0.6 inches, or as great as 0.8 inches, 1.0 inches, 1.2 inches, or 1.4 inches, for example, or may be within any range defined between any two of the foregoing values, such as 0.1 to 1.4 inches, 0.2 to 1.2 inches, 0.4 to 1.0 inches, 0.6 to 0.8 inches, 0.1 to 0.2 inches, or 0.8 to 1.4 inches, for example. In some embodiments, the height H of the rethreading slot 152 may be 1.5 inches or less, although any of a variety of dimensions are contemplated.

In some embodiments, as shown in FIGS. 14 and 15, the resilient portion 90 of the low friction material strip 88 may not extend beyond an end 160 of the of the screen edge retention feature 86. The end 160 is an end of the screen edge retention feature 86 closest to the sill 20. Thus, the resilient portion 90 may not be opposite the chamfered portion 154 and the transition portion 156 to prevent the resilient portion 90 from pushing against the screen material 60 which may otherwise increase the tension on the screen material 60 an interfere with the retraction of the screen material 60 by the roller assembly 58.

As further shown in FIGS. 14 and 15, in some embodiments, the first slot 71 may further include a bump 162 projecting into the first slot 71 adjacent to the end 160 of the screen edge retention feature 86. The end 160 can be somewhat abrasive to the screen material 60, particularly as the lower sash 16 is raised and the screen material 60 moves past the end 160. In some embodiments, the bump 162 may have a smooth, convex cross-sectional profile, as shown in FIG. 14. The bump 162 can help reduce damage to the screen material 60 as it passes over the edge 160. Because the resilient portion 90 of the low friction material strip 88 may not extend beyond the end 160 of the of the screen edge retention feature 86, the resilient portion 90 may not be opposite the bump 162 to prevent the resilient portion 90 from pushing against the control bar 64, which may otherwise interfere with the movement of the control bar 64. Such interference could increase the force required to open the lower sash 16, or cause the control bar 64 to inadvertently disconnect from the lower sash 16. Although the bump 162 is shown and described with respect to the lower sash 16 it is understood that the same description can be applied to the upper sash 14 as an additional or alternative feature.

In embodiments including the chamfered portion 154 or the transition portion 156, the bump 162 may disposed between the end 160 of the screen edge retention feature 86 and the transition portion 156.

Figure 16:
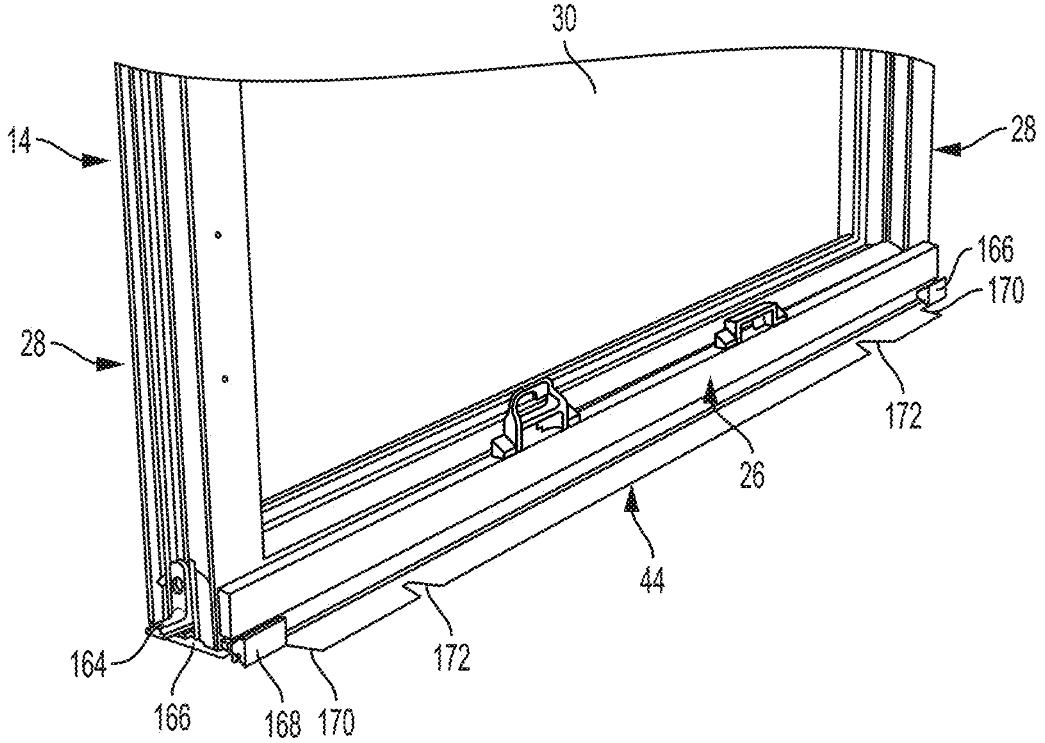
FIG. 16 is a perspective view of a portion of the upper sash of the fenestration assembly of FIG. 1 including a check rail seal, according to some embodiments of the disclosure.
Figure 18:
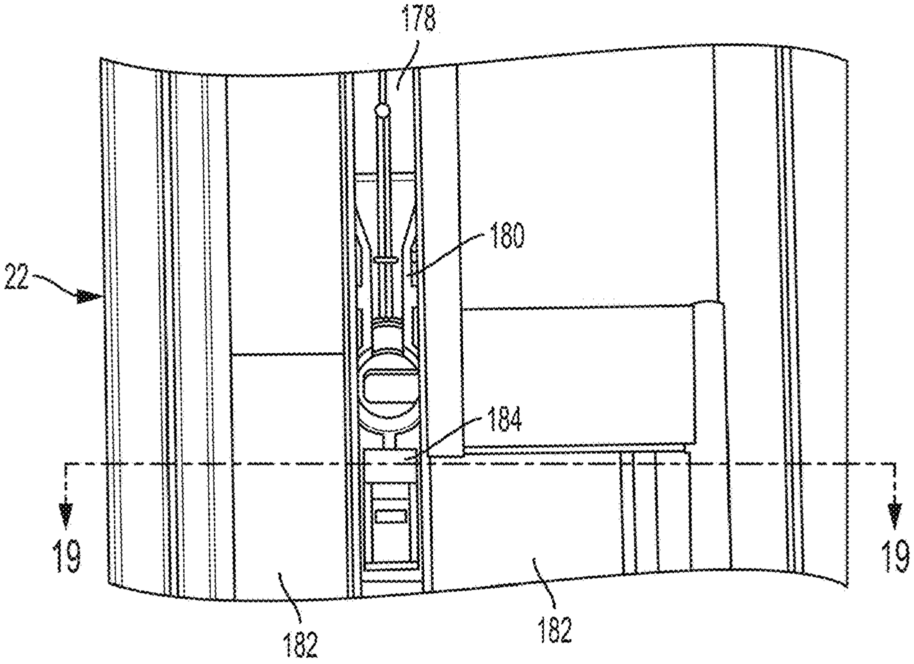
FIG. 18 is a side view of another portion of one of the jambs of the fenestration assembly of FIG. 1, according to some embodiments of the disclosure.
Figure 19:
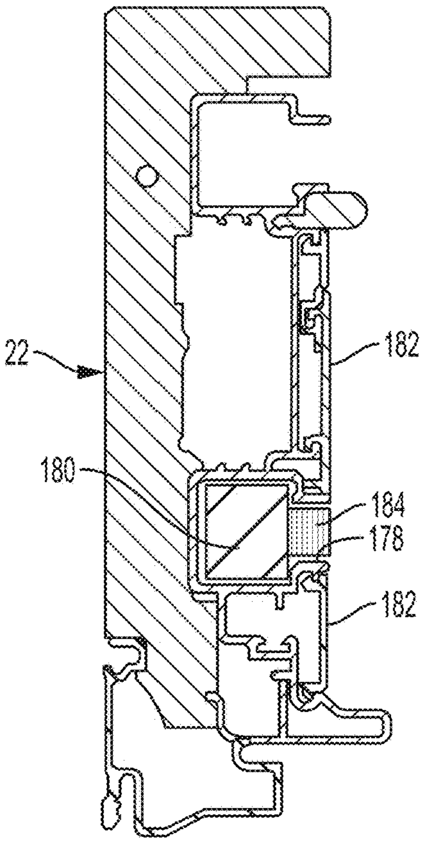
FIG. 19 is a cross-sectional view of the portion of the jamb shown in FIG. 18.

FIG. 16 is a perspective view of a portion of the upper sash 14 including the check rail seal 44 of the fenestration assembly 10 of FIG. 1, according to some embodiments of the disclosure. As shown in FIG. 16, the upper sash 14 may further include two sash terminals 164 (one visible in FIG. 16), two check rail end seals 166 (one visible in FIG. 16), and two mohair pads 168. In some embodiments, the check rail seal 44 can form two stile notches 170. In some embodiments, the check rail seal 44 can also form at least one muntin notch 172 (two shown in FIG. 16). The sash terminals 164 can engage corresponding balance shoes 180 in balance shoe channels 178 in the jambs 22, as shown in FIGS. 18 and 19.

In some embodiments, the check rail seal 44 can extend the width of the upper sash 14 (e.g., along an entire length of the lower rail 26), and project from the lower rail 26 toward the lower sash 16 as shown in FIG. 2. The check rail seal 44 is flexible and able to seal against external surfaces of the lower sash 16, including the upper rail 32, the lower rail 34, the stiles 36, and the window pane 38 to reduce the number of insects and other pests that may try to pass between the upper sash 14 and the lower sash 16 (FIG. 2). Alternatively, in some embodiments, the check rail seal 44 can extend the width of the lower sash 16 (e.g., along an entire length of the upper rail 32), and project from the upper rail 32 toward the upper sash 14 to seal against external surfaces of the upper sash 14, including the upper rail 24, the lower rail 26, the stiles 28, and the window pane 30 to reduce the number of insects and other pests that may try to pass between the upper sash 14 and the lower sash 16. In some embodiments, two check rail seals 44 may be included, one projecting from the lower rail 26 toward the lower sash 16, and another projecting from the upper rail 32 toward the upper sash 14.

In some embodiments, the check rail seal 44 may just physically contact the external surfaces of the lower sash 16, including the upper rail 32, the lower rail 34, the stiles 36, and the window pane 38. In some embodiments, the check rail seal 44 may physically contact the external surfaces of the lower sash 16, including the upper rail 32, the lower rail 34, the stiles 36, and the window pane 38 with an interference fit. The interference fit can be as little as 0.01 inches, 0.02 inches, 0.03 inches, 0.04 inches, or 0.05 inches, or a great as 0.06 inches, 0.08 inches, 0.10 inches or 0.12 inches, or may be within any range defined between any two of the foregoing values, such as 0.02 inches to 0.12 inches, 0.03 inches to 0.10 inches, 0.04 to 0.08 inches, 0.05 to 0.06 inches, or 0.04 inches to 0.06 inches, for example. In some other embodiments, the check rail 44 may not physically contact the external surfaces of the lower sash 16, including the upper rail 32, the lower rail 34, the stiles 36, and the window pane 38, but may form a gap small enough to discourage bugs from passing through. The gap may be as little as 0.01 inches, 0.02 inches, 0.03 inches, 0.04 inches, or 0.05 inches, or a great as 0.06 inches, 0.08 inches, 0.10 inches or 0.12 inches, or may be within any range defined between any two of the foregoing values, such as 0.02 inches to 0.12 inches, 0.03 inches to 0.10 inches, 0.04 to 0.08 inches, 0.05 to 0.06 inches, or 0.04 inches to 0.06 inches, for example, although a variety of dimensions are contemplated.

The two stile notches 170 can be disposed at opposite ends of the check rail seal 44 to accommodate the stiles 28. Without the stile notches 170, portions of the check rail seal 44 displaced by the stiles 28 might be pushed outward and not be aesthetically pleasing. In embodiments including one or more muntins (not shown), a corresponding number of muntin notches 172 may be disposed between the two stile notches 170 and spaced apart from the two stile notches 170 to align with the muntins. As with the stile notches 170, without the muntin notches 172, portions of the check rail seal 44 displaced by the muntins might be pushed outward and not be aesthetically pleasing.

The check rail end seals 166 can be a leaf seals configured to seal against portions of the jamb 22, as described below in reference to FIGS. 18 and 19. Each of the two check rail end seals 166 can project from opposite ends of the lower rail 26, or the upper rail 32, toward the jambs 22 to form an interference fit with the jambs 22 to discourage bugs from passing through the fenestration assembly 10 between the jamb 22 and the upper sash 14. The mohair pads 168 are disposed at the ends of the lower rail 26 to seal between the jamb 22, the check rail seal 44 and the check rail end seal 166.

Figure 17:
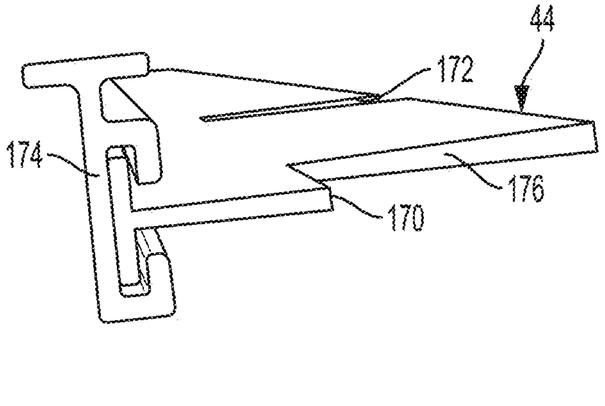
FIG. 17 is a side perspective view of the check rail seal of FIG. 16, according to embodiments of the disclosure.

FIG. 17 is a side perspective view of the check rail seal 44, according to some embodiments of the disclosure. In some embodiments, the check rail seal 44 can include a seal receptor 174 and a seal strip 176 projecting from the seal receptor 174. In some embodiments, the seal receptor 174 may connect to the lower rail 26 to connect the seal strip 176 to the lower rail 26. In some embodiments (not shown), the seal receptor 174 may connect to the upper rail 32 to connect the seal strip 176 to the upper rail 32.

In some embodiments, the seal strip 176 can include a plurality of monofilament fibers and form a bristle strip. The bristle strip can be thick enough to effectively block bugs, but not so thick as to be aesthetically unpleasing. The thickness of the bristle strip can be measured in the number of ends of the plurality of monofilament fibers per linear inch of the check rail seal 44. The thickness of the bristle strip can be as little as 200 ends per inch (EPI), 250 EPI, 300 EPI, 350 EPI, 400 EPI, or 500 EPI, or as great as 600 EPI, 800 EPI, 1,000 EPI, 1,200 EPI, 1,600 EPI, or 2,000 EPI, or may be within any range defined between any two of the foregoing values, such as 200 EPI to 2,000 EPI, 250 EPI to 1,600 EPI, 300 EPI to 1,200 EPI, 350 EPI to 1,000 EPI, 400 EPI to 800 EPI, 500 EPI to 600 EPI, or 300 EPI to 400 EPI, for example.

In some other embodiments, the seal strip 176 can include pile, sheet, or fabric material that forms a sheet-type seal. In some embodiments, the seal strip 176 can include a polyvinylchloride-coated fiberglass screen material that forms a sheet-type seal. In yet other embodiments, the seal strip 176 can include a flexible polymer, such as nylon, polypropylene, polyethylene, or rubber, for example that forms a flexible leaf seal. In some embodiments, the seal strip 176 can include wool.

In some embodiments, the seal receptor 174 and the seal strip 176 may be two separable parts. In some other embodiments, the seal receptor 174 and the seal strip 176 may bonded together to form the check rail seal 44 as a single part. In yet other embodiments, the seal receptor 174 and the seal strip 176 may be fully integrated such that the check rail seal 44 is a monolithic structure.

FIGS. 18 and 19 are views of another portion of one of the jambs 22 of the fenestration assembly 10 of FIG. 1, including a balance shoe extension, according to some embodiments of the disclosure. FIG. 18 is a side view of the jamb 22 from inside the frame 12. As shown in FIG. 18, the jamb 22 may further includes a balance shoe channel 178, a balance shoe 180, and jamb covers 182. The balance shoe 180 may include a balance shoe extension 184. The balance shoe channel 178 can extend along the length of the jamb 22. The balance shoe 180 is disposed within the balance shoe channel 178 and may move along the balance shoe channel

178. The sash terminal 164 (FIG. 16) can engage the balance shoe 180 such that the balance shoe 180 and the sash terminal 164 may move together as the upper sash 14 is raised and lowered with the frame 12. The balance shoe 180 may be connected to another force, such as a spring or a weight, to counterbalance the weight of the upper sash 14, providing for smooth, easy movement of the upper sash 14 within the frame 12. The balance shoe extension 184 can be connected to the balance shoe 180. The jamb covers 182 can extend along the length of the jamb 22. The jamb covers 182 may provide a pleasing aesthetic appearance to the jamb 22.

FIG. 19 is a cross-sectional view of the portion of the jamb 22 shown in FIG. 18. As shown in FIG. 19, together, the balance shoe 180 and the balance shoe extension 184 fill the balance shoe channel 178 in cross-section, providing a barrier to discourage bugs from passing through fenestration assembly 10 by way of the balance shoe channel 178. In addition, the balance shoe extension 184 provides the balance shoe 180 with a surface that is about flush with the jamb covers 182. The check rail end seal 166 can form an interference fit with the jamb 22 along the surface formed by the jamb covers 182 and the balance shoe extension 184 to discourage bugs from passing through the fenestration assembly 10 between the jamb 22 and the upper sash 14.

Figure 20:
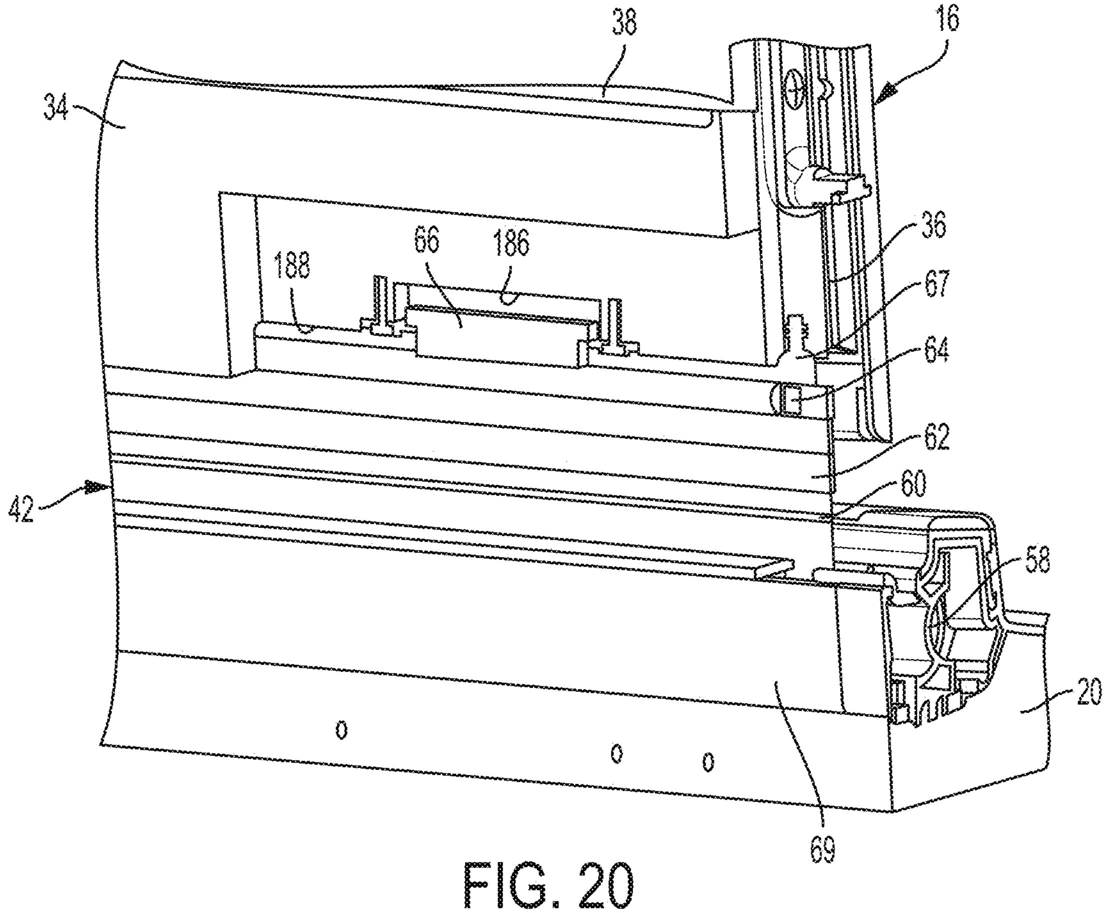
FIG. 20 is a partial perspective view of a portion of the fenestration assembly of FIG. 1, according to some embodiments of the disclosure.

FIG. 20 is a partial perspective view of a portion of the fenestration assembly 10, according to some embodiments of the disclosure. As shown in FIG. 20, the lower rail 34 can form a pocket 186 to accommodate the magnet 66. In the embodiment of FIG. 20, the magnet 66 is free to move vertically within the pocket 186, or to "float" within the pocket 186, while permitting the magnet 66 to project beyond a surface 188 of the lower sash 16. The vertical freedom of movement of the magnet 66 within the pocket 186 provides sufficient travel to insure that the sill seal 67 is fully seated against the sill 20 when the lower sash 16 is in the closed configuration. That is, the magnet 66 does not limit the travel of the lower sash 16.

Figure 21A:
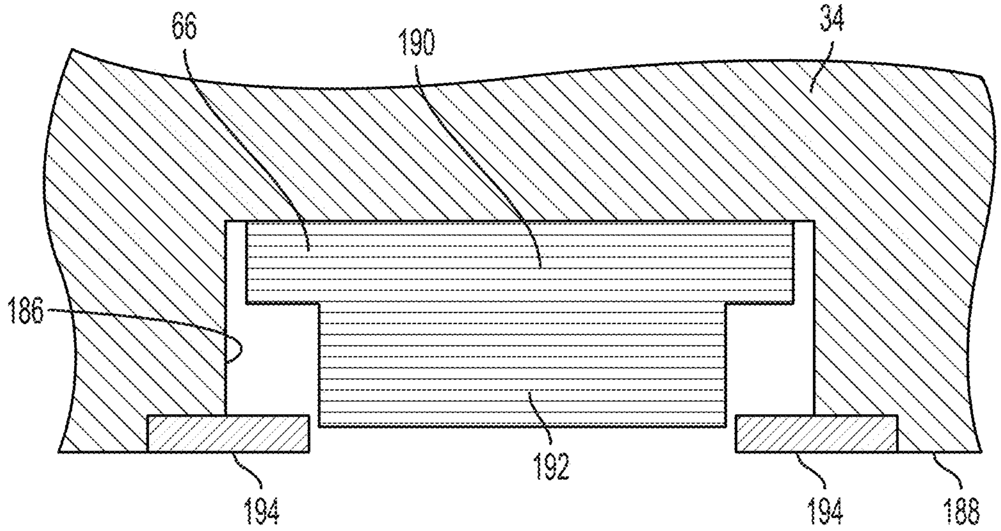
FIGS. 21A and 21B are schematic cross-sectional views of the lower rail including the magnet of FIG. 1, according to some embodiments of this disclosure.
Figure 21B:
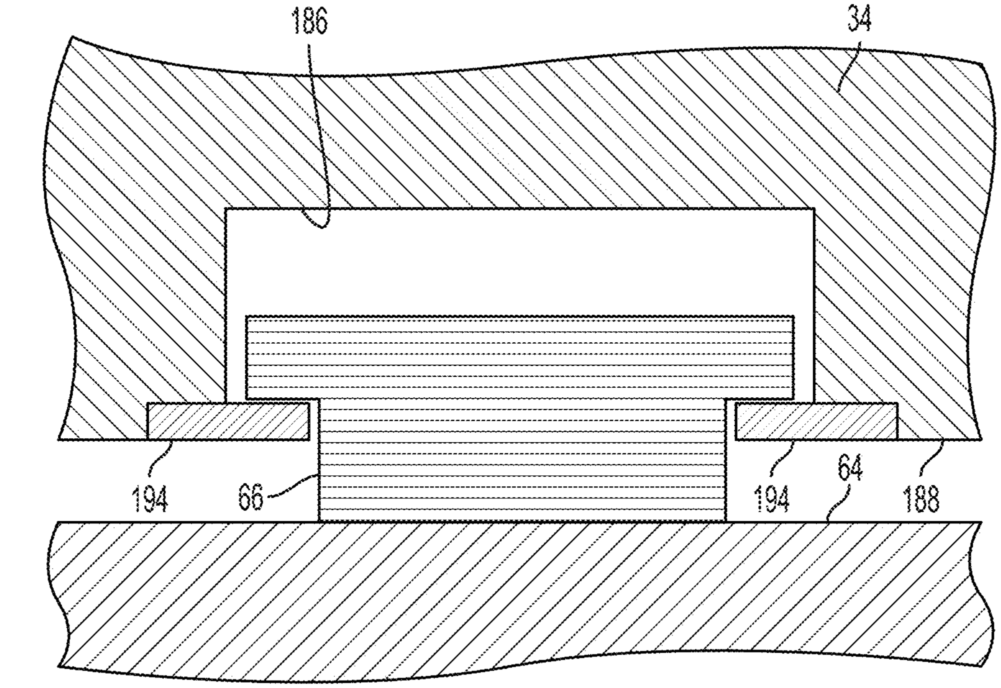

FIGS. 21A and 21B are schematic cross-sectional views of the lower rail 34 including the magnet 66, according to some embodiments of this disclosure. FIGS. 21A and 21B show that the magnet 66 can include a first portion 190 and a second portion 192. The first portion 190 is wider in the lengthwise direction of the lower rail 34 than the second portion 192. As also shown in FIGS. 21A and 21B, the lower rail 34 can further include a magnet stop 194. The magnet stop 194 can include two separate magnet stops 194, as shown, or a single magnet stop 194 that extends around a perimeter of the pocket 186. The magnet stop 194 is disposed at the surface 188 of the lower sash 16 and projects into the pocket 186. FIG. 21A shows the magnet 66 in a first position in which the magnet 66 does not project beyond the surface 188 of the lower sash 16. FIG. 21B shows the magnet 66 in a second position in which a portion of the magnet 66 projects beyond the surface 188 of the lower sash 16. The magnet stop 194 projects into the pocket 186 such that movement of the second portion 192 of the magnet 66 is not impeded, while movement of the first portion 190 is restricted by the magnet stop 194. Thus, as shown in FIG. 21B, when the control bar 64 approaches the surface 188 of the lower sash 16, such as when the lower sash 16 is in the closed configuration, the control bar 64 automatically engages the magnet 66, thus attaching the control bar 64 to the lower sash 16. By floating within the pocket 186, the magnet 66 can be continuously moveable between the first position and the second position.

Although the embodiments of FIGS. 20, 21A, and 21B are shown and described with respect to the lower screen assembly 42 and a single magnet 66, it is understood that the same description can be applied to a plurality of magnets 66, and to the upper screen assembly 40 and one or more magnets 54 (FIG. 2).

Figure 22A:
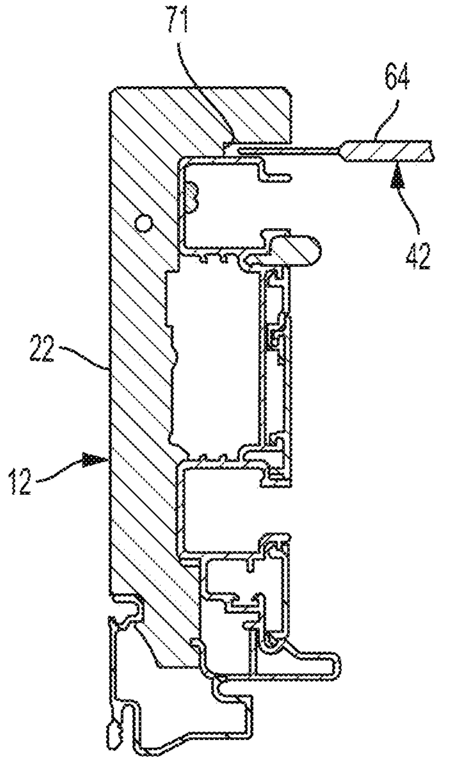
FIGS. 22A and 22B are cross-sectional views of a jamb of the fenestration assembly of FIG. 1, where a lower sash can slideably engage the jamb, according to some embodiments of the disclosure.
Figure 22B:
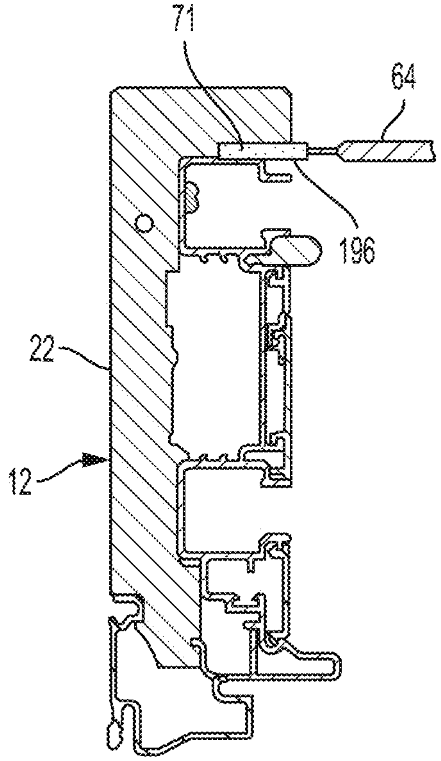

FIGS. 22A and 22B are cross-sectional views of the jamb 22 of the fenestration assembly 10 of FIG. 1, where the lower sash 16 can slideably engage the jamb 22, according to some embodiments of the disclosure. In FIG. 22A, a portion of the screen material 60 has been unwound from the roller assembly 58 of the lower screen assembly 42 by moving the lower sash 16 away from the sill 20, as shown in FIGS. 1 and 2. As shown in FIG. 22A, each of the jambs 22 include the first slot 71 formed by the jamb 22. Although only one of the two jambs 22 is shown in FIG. 22A for ease of illustration, it is understood that each of the jambs 22 includes the first slot 71, thus, fenestration assembly 10 includes two first slots 71. The control bar 64 is wider than the lower sash 16 so that it can project into the first slots 71 of each of the two jambs 22 as screen material 60 is unwound from the roller assembly 58.

In FIG. 22B, the lower sash 16 has been moved away from the sill 20 to a point where it is desirable that the control bar 64 be disengaged from the magnet 66. As shown in the embodiment of FIG. 22B, each of the first slots 71 includes a stop 196. The stop 196 presents a barrier to the continued travel of the control bar 64 along the first slot 71, and thus separates the control bar 64 from the magnet 66 as the lower sash 16 is moved beyond the point where it is desirable that the control bar 64 be disengaged from the magnet 66. In this way, the stops 196 are configured to prevent movement of the control bar 64 beyond the stops 196, and automatically disengage the control bar 64 from the magnet 66 if the lower sash 16 moves beyond the stops 196. Once the control bar 64 is disengaged from the magnet 66, the tension applied to the end 62 of the screen material 60 is eliminated, permitting the rotational bias of the roller assembly 58 to wind the screen material 60 around the roller assembly 58.

Figure 23A:
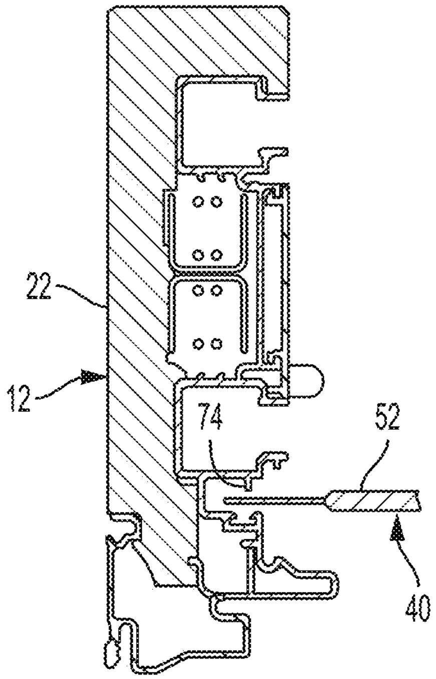
FIGS. 23A and 23B are cross-sectional views of a jamb of the fenestration assembly of FIG. 1, where an upper sash can slideably engage the jamb, according to some embodiments of the disclosure.
Figure 23B:
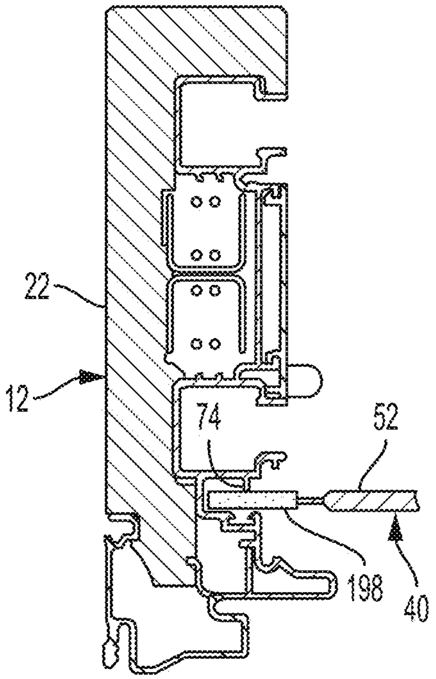

FIGS. 23A and 23B are cross-sectional views of the jamb 22 of the fenestration assembly 10 of FIG. 1, where the where the upper sash 14 can slideably engage the jambs 22, according to some embodiments of the disclosure. In FIG. 23A, a portion of the screen material 48 has been unwound from the roller assembly 46 of the upper screen assembly 40 by moving the upper sash 14 away from the head 18, as shown in FIGS. 1 and 2. As shown in FIG. 23A, each of the jambs 22 can include the second slot 74 formed by the jamb 22. Although only one of the two jambs 22 is shown in FIG. 23A for ease of illustration, it is understood that each of the jambs 22 includes the second slot 74, thus, fenestration assembly 10 includes two second slots 74. The control bar 52 is wider than the upper sash 14 so that it can project into the second slots 74 of each of the two jambs 22 as screen material 48 is unwound from the roller assembly 46.

In FIG. 23B, the upper sash 14 has been moved away from the head 18 to a point where it is desirable that the control bar 52 be disengaged from the magnet 54. As shown in the embodiment of FIG. 23B, each of the second slots 74 includes a stop 198. The stop 198 presents a barrier to the continued travel of the control bar 52 along the second slot 74, and thus separates the control bar 52 from the magnet 54 as the upper sash 14 is moved beyond the point where it is desirable that the control bar 52 be disengaged from the magnet 54. In this way, the stops 198 are configured to prevent movement of the control bar 52 beyond the stops 198, and automatically disengage the control bar 52 from the magnet 54 if the upper sash 14 moves beyond the stops 198.

Once the control bar 52 is disengaged from the magnet 54, the tension applied to the end 50 of the screen material 48 is eliminated, permitting the rotational bias of the roller assembly 46 to wind the screen material 48 around the roller assembly 46.

Figure 24A:
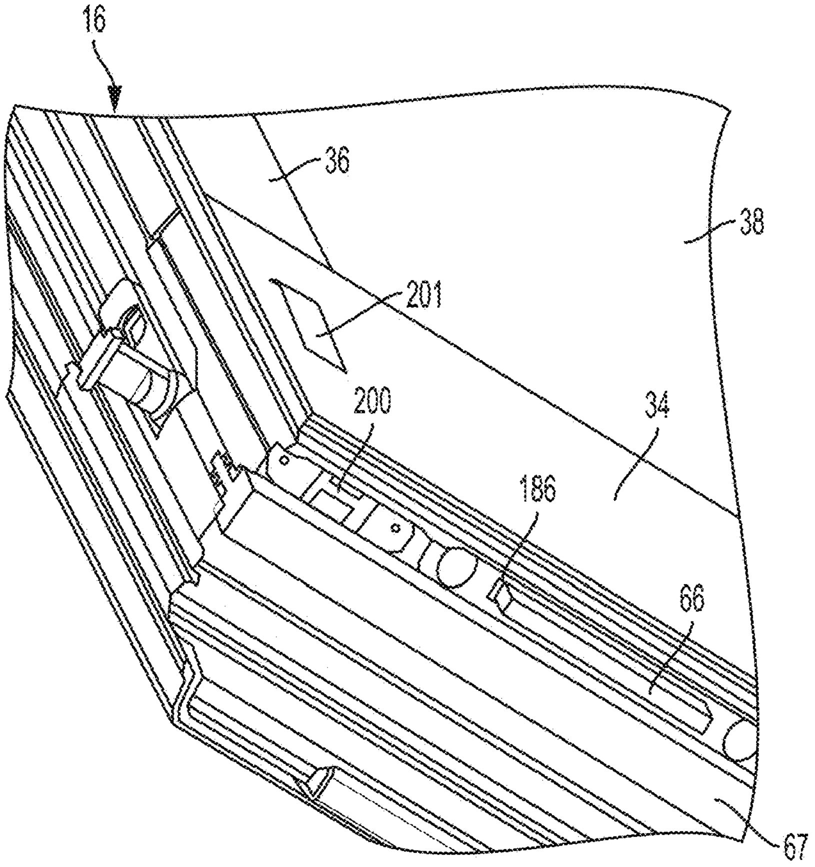
FIGS. 24A and 24B are perspective views of a screen release mechanism, according to some embodiments of this disclosure.
Figure 24B:
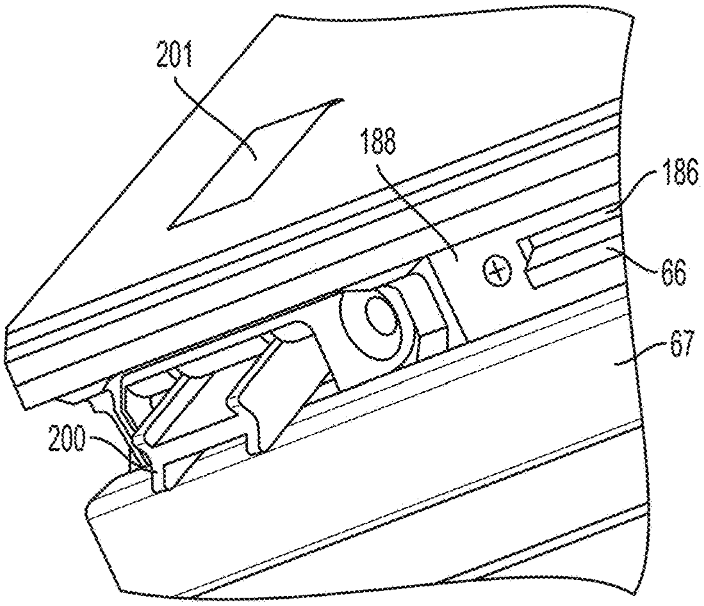

FIGS. 24A and 24B are perspective views of a screen release mechanism, according to some embodiments of this disclosure. FIG. 24A shows a portion of the lower sash 16 including the magnet 66 at least partially within the pocket 186. In the embodiment of FIG. 24A, the lower sash 16 further includes an ejector 200 and ejector ribbon 201. The ejector 200 faces the control bar 64 (omitted here for clarity, see FIGS. 20 and 21B). FIG. 24A shows the ejector 200 in a first position in which the ejector 200 is at or below the surface 188 of the lower sash 16. FIG. 24B shows the ejector 200 in a second position in which a portion of the ejector 200 projects beyond the surface 188 of the lower sash 16 to disengage the control bar 64 from the magnet 66. Once the control bar 64 is disengaged from the magnet 66, the tension applied to the end 62 of the screen material 60 is eliminated, permitting the rotational bias of the roller assembly 58 to wind the screen material 60 around the roller assembly 58. The ejector ribbon 201 may be made of fabric and be mechanically connected to the ejector 200. The ejector 200 can be activated by pulling on the ejector ribbon 201. In other embodiments, the ejector 200 can be activated by other means mechanically connected to the ejector 200, such as a switch, push button, or lever, for example.

Figure 25A:
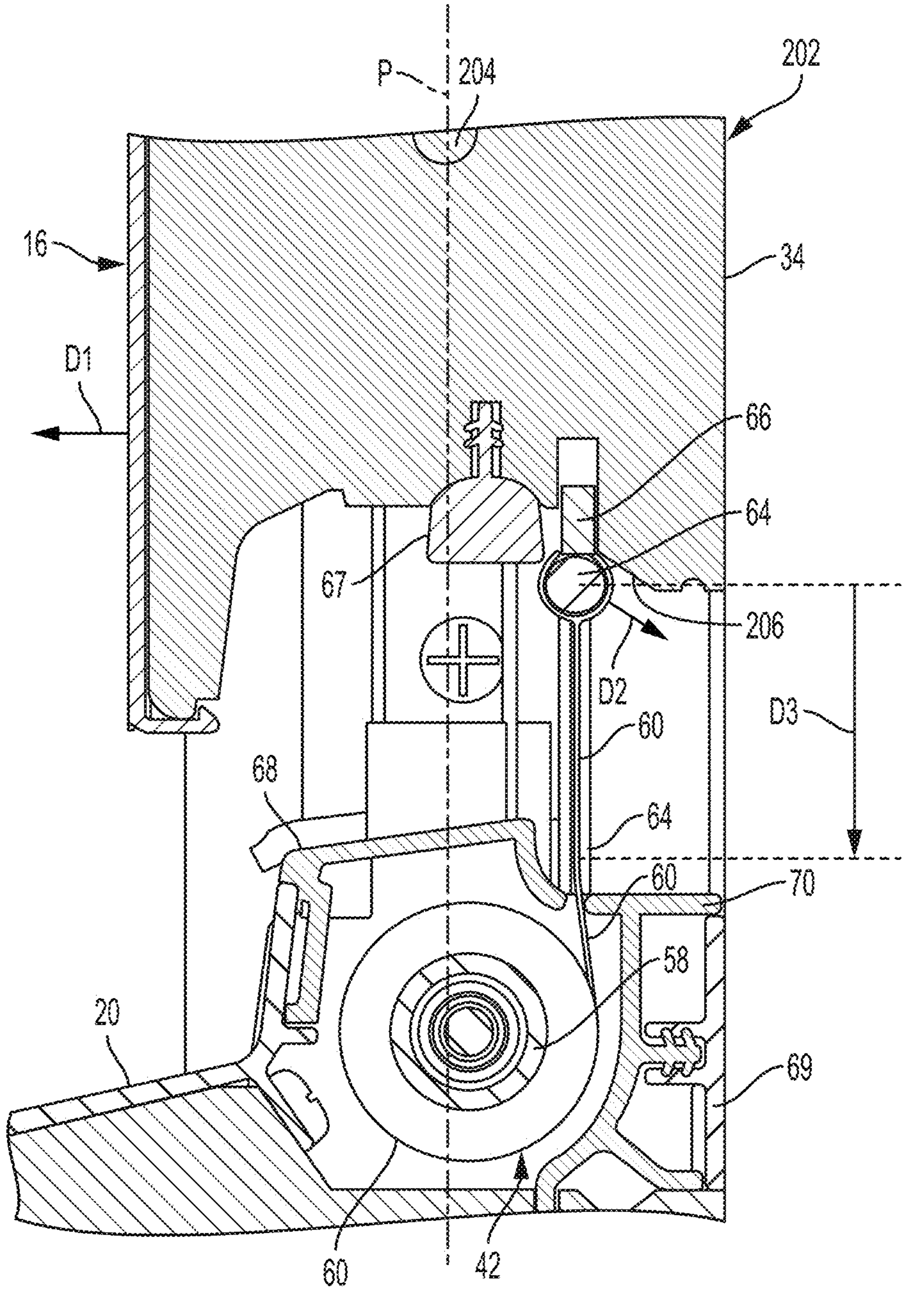
FIGS. 25A and 25B are cross-sectional views of a portion of another fenestration assembly, according to some embodiments of this disclosure.
Figure 25B:
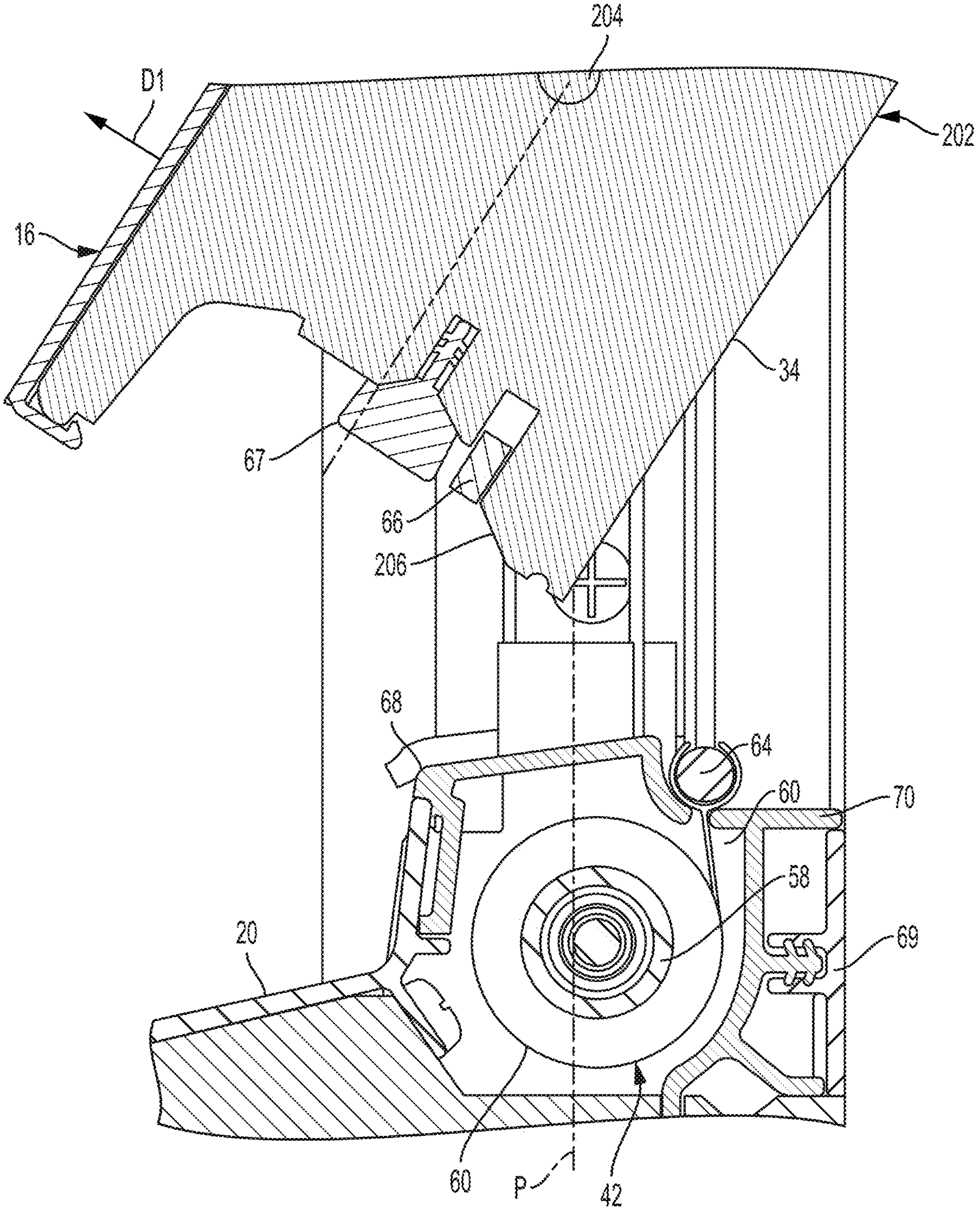

FIGS. 25A and 25B are cross-sectional views of a portion of another fenestration assembly, according to some embodiments of this disclosure. FIGS. 25A and 25B show a fenestration assembly 202 which can be substantially similar to the fenestration assembly 10 discussed above, except that in the fenestration assembly 202, the lower sash 16 is configured to tilt out of a plane P of the frame 12 (FIG. 1) about a pivot point 204. FIG. 25A shows the fenestration assembly 202 with the lower sash 16 in the plane P and FIG. 25B shows the fenestration assembly 202 with the lower sash 16 tilted out of the plane P. The ability to tilt the lower sash 16 out of a plane P permits access to an external surface of the window pane 38 for cleaning. In the embodiment of FIGS. 25A and 25B, the lower sash 16 further includes a rail slope 206. The rail slope 206 is an angled portion of the lower rail 34 adjacent to the magnet 66. Considering FIGS. 25A and 25B together, as the lower sash 16 is tilted out of the plane P and about the pivot point 204 in a direction D1, the rail slope 206 wedges between the magnet 66 and the control bar 64. The control bar 64 moves along the rail slope 206 in a direction D2, away from the magnet 66. Once sufficiently separated from the magnet 66, the control bar 64 disengages from the magnet 66. The rotational bias of the roller assembly 58 moves the control bar 64 in the direction D3 as it winds the screen material 60 around the roller assembly 58.

Although the embodiments of FIGS. 24A, 24B, 25A, and 25B are shown and described with respect to the lower screen assembly 42 it is understood that the same description can be applied to the upper screen assembly 40. In addition, is understood that the embodiment of FIGS. 25A and 25B can include any of the features shown in FIGS. 20, 21A, 21B, 22A, 22B, 23A, 23B, 24A, and 24B.

Figure 26A:
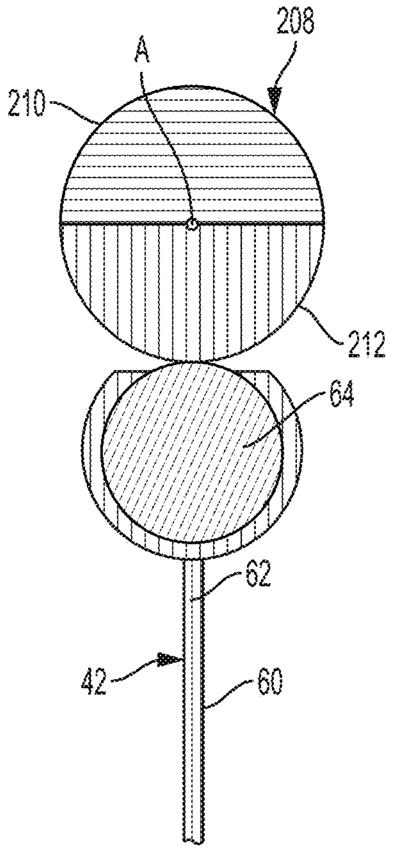
FIGS. 26A and 26B are cross-sectional views of another magnet and portion of a screen assembly, according to some embodiments of this disclosure.
Figure 26B:
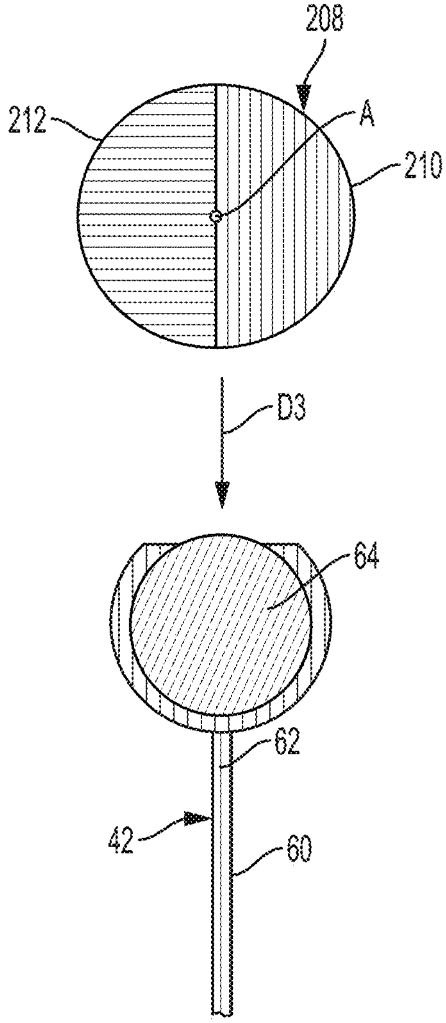

FIGS. 26A and 26B are cross-sectional views of another magnet and portion of a screen assembly, according to some embodiments of this disclosure. FIG. 26A shows a portion of the lower screen assembly 42 as describe above in reference to FIGS. 1 and 2, including the control bar 64 disposed at the end 62 of the screen material 60 (the remainder of the fenestration assembly 10 is omitted for clarity). In the embodiment of FIG. 26A, the magnet 66 described in embodiments above can be replaced by cylindrical magnet 208. The cylindrical magnet 208 is rotatable about a longitudinal axis A to disengage the control bar 64 from the cylindrical magnet 208. The cylindrical magnet 208 is polarized across its diameter, resulting in a north pole segment 210 diametrically opposed to a south pole segment 212. In FIG. 26A, the south pole segment 212 is directed toward the control bar 64, resulting in a strong magnetic force or attraction between the control bar 64 and the cylindrical magnet 208. This first level of magnetic force is sufficient to engage the control bar 64. An equally strong magnetic force would be formed if the cylindrical magnet 208 were rotated 180 degrees about its longitudinal axis A such that the north pole segment 210 were directed toward the control bar 64. However, as the cylindrical magnet 208 is rotated about its longitudinal axis A between these orientations, the magnetic force or attraction between the control bar 64 and the cylindrical magnet 208 diminishes.

In FIG. 26B, the cylindrical magnet 208 has been rotated about its longitudinal axis A such that the north pole segment 210 and the south pole segment 212 are directed at right angles away from the control bar 64, resulting in a negligible magnetic attraction between the control bar 64 and the cylindrical magnet 208. This second level of magnetic force is insufficient to engage the control bar 64. Thus, in the embodiment of FIGS. 26A and 26B, rotating the cylindrical magnet 208 about its longitudinal axis A varies the magnetic force in the direction of the control bar 64 between a first level of magnetic force sufficient to engage the control bar 64 and a second level of magnetic force insufficient to engage the control bar 64. Once the control bar 64 is rotated to the second level of magnetic force, the rotational bias of the roller assembly 58 disengages the control bar 64 from the cylindrical magnet 208 and moves the control bar 64 in the direction D3 as it winds the screen material 60 around the roller assembly 58 (FIG. 2).

Although the embodiment of FIGS. 26A and 26B is shown and described with respect to the lower screen assembly 42, it is understood that the same description can be applied to the upper screen assembly 40.

Various modifications and additions can be made to the examples discussed without departing from the scope of the present disclosure. For example, while the examples described above refer to particular features, the scope of this disclosure also includes examples having different combinations of features and examples that do not include all of the above described features.

We claim:

1. A fenestration assembly comprising:

a sash;

a frame surrounding the sash, the frame including:

a head; and a sill; and two jambs connecting the head to the sill, the sash slideably engaged with the two jambs, each of the two jambs including:

an interior facing surface perpendicular to a plane of the sash;

a first slot in the interior facing surface and extending longitudinally from the sill and toward the head, the first slot defining first and second opposing inner faces parallel to the plane of the sash, the first slot including:

a chamfered portion defined at an intersection of the interior facing surface of the jamb and the first inner face of the first slot at an end of the first slot adjacent to the sill; and a transition portion between the chamfered portion and a remainder of the first slot; and a rethreading slot through the jamb and into communication with the first slot, and disposed at an end of the jamb adjacent to the sill; and a screen assembly mounted in the sill, the screen assembly including:

a roller assembly substantially hidden from view; and a screen material attached to the roller assembly, a leading end of the screen material coupled to the sash, the screen assembly configured to wind the screen material around the roller assembly and to permit the screen material to unwind from the roller assembly, edges of the screen material extending into the first slot of each of the two jambs; and wherein the rethreading slot facilitates automatic rethreading of the edges of the screen material into the first slot of each of the two jambs when the leading end of the screen material moves through the chamfered portion and the transition portion of the first slot during the winding of the screen material if the edges of the screen material, when not wound on the roller assembly, have been forced out of the first slot.

2. The fenestration assembly of claim 1, wherein a height of each rethreading slot is approximately 1.5 inches or less.

3. The fenestration assembly of claim 1, wherein each transition portion includes a surface curvature that blends the chamfered portion with the remainder of the first slot.

4. The fenestration assembly of claim 1, wherein the frame further includes a screen edge retention feature disposed within, and extending along at least a portion of, the remainder of each first slot; and the screen assembly further includes a plurality of raised features, at least one of the plurality of raised features attached to each of the edges of the screen material and extending along a portion of the edges of the screen material, the raised features configured to engage the screen edge retention features and retain each of the edges of the screen material at least partially within the first slot of each of the two jambs.

5. The fenestration assembly of claim 4, wherein each of the two jambs further includes a low friction material strip disposed within, and extending along, each of the first slots opposite each screen edge retention feature, the low friction material strip including a resilient portion projecting toward the screen edge retention feature, the resilient portion not extending beyond an end of the screen edge retention feature nearest the sill.

6. The fenestration assembly of claim 1, wherein the leading end of the screen material is releasably coupled to the sash.

7. The fenestration assembly of claim 6, further comprising a control bar on the leading end of the screen material, wherein the control bar is releasably coupled to the sash.

8. The fenestration assembly of claim 7, further comprising magnets to releasably couple the control bar to the sash.

* * * * *